US010696010B2

(12) United States Patent
Mori et al.

(10) Patent No.: US 10,696,010 B2
(45) Date of Patent: Jun. 30, 2020

(54) PLUGGED HONEYCOMB STRUCTURE AND PLUGGED HONEYCOMB SEGMENT

(71) Applicant: NGK INSULATORS, LTD., Nagoya (JP)

(72) Inventors: Kazuya Mori, Nagoya (JP); Toshihiro Hirakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/245,629

(22) Filed: Aug. 24, 2016

(65) Prior Publication Data

US 2017/0057196 A1    Mar. 2, 2017

(30) Foreign Application Priority Data

Sep. 2, 2015 (JP) ................. 2015-172705

(51) Int. Cl.
*B32B 3/12* (2006.01)
*B32B 9/04* (2006.01)
(Continued)

(52) U.S. Cl.
CPC ............ *B32B 3/12* (2013.01); *B01D 46/2455* (2013.01); *B01D 46/2474* (2013.01);
(Continued)

(58) Field of Classification Search
CPC ............ B01D 46/2455; B01D 46/2474; B32B 15/04; B32B 15/043; B32B 3/12;
(Continued)

(56) References Cited

U.S. PATENT DOCUMENTS 9,080,484 B2    7/2015 Miyairi
D763,427 S     8/2016 Miyairi
(Continued)

FOREIGN PATENT DOCUMENTS

JP    2014-200741 A1    10/2014
JP    2015-029939 A1    2/2015
(Continued)

OTHER PUBLICATIONS

Japanese Office Action (with English translation), Japanese Application No. 2015-172705, dated Jan. 8, 2019 (8 pages).

*Primary Examiner* — David Sample
*Assistant Examiner* — Elizabeth Collister
(74) *Attorney, Agent, or Firm* — Burr & Brown, PLLC

(57) ABSTRACT

A plugged honeycomb structure includes: a plurality of honeycomb segments, a bonding layer, and a plugging portions to plug open ends of cells of each of the honeycomb segments. The honeycomb segment is configured so that the cells having at least two kinds of different shapes are disposed in a cross section orthogonal to an extension direction of the cells, the honeycomb segment has a center region and an circumferential region located in the circumference of the center region, the center region has a cell arrangement pattern such that inflow cells surround one outflow cell, in the inflow end face of the honeycomb segment, the circumferential region has an open frontal area that is smaller than an open frontal area of the center region, the segment circumferential wall of the honeycomb segment and the bonding layer have a special thickness.

4 Claims, 14 Drawing Sheets

(51) Int. Cl.
*C04B 38/00* (2006.01)
*B32B 15/04* (2006.01)
*B32B 9/00* (2006.01)
*B01D 46/24* (2006.01)
*C04B 35/638* (2006.01)
*C04B 37/02* (2006.01)
*C04B 35/636* (2006.01)
*C04B 35/565* (2006.01)
*C04B 35/63* (2006.01)
*F01N 3/022* (2006.01)
*C04B 111/00* (2006.01)

(52) U.S. Cl.
CPC ............ *B32B 9/005* (2013.01); *B32B 9/041* (2013.01); *B32B 15/04* (2013.01); *B32B 15/043* (2013.01); *C04B 35/565* (2013.01); *C04B 35/638* (2013.01); *C04B 35/6316* (2013.01); *C04B 35/6365* (2013.01); *C04B 37/021* (2013.01); *C04B 38/0009* (2013.01); *F01N 3/0222* (2013.01); *B32B 2307/302* (2013.01); *B32B 2307/306* (2013.01); *B32B 2307/732* (2013.01); *B32B 2605/08* (2013.01); *C04B 2111/00793* (2013.01); *C04B 2235/3826* (2013.01); *C04B 2235/428* (2013.01); *C04B 2235/606* (2013.01); *C04B 2235/6021* (2013.01); *C04B 2237/062* (2013.01); *C04B 2237/365* (2013.01); *C04B 2237/708* (2013.01)

(58) Field of Classification Search
CPC ... B32B 9/005; B32B 9/041; B32B 2307/302; B32B 2307/306; B32B 2307/732; B32B 2605/08; C04B 35/565; C04B 35/6316; C04B 35/6365; C04B 35/638; C04B 37/021; C04B 38/0009; C04B 2111/00793; C04B 2235/3826; C04B 2235/428; C04B 2235/6021; C04B 2235/606; C04B 2237/062; C04B 2237/365; C04B 2237/708; F01N 3/0222
USPC .......................................... 428/116, 117, 118
See application file for complete search history.

(56) References Cited

U.S. PATENT DOCUMENTS

| | | |
|---|---|---|
| 2014/0298779 A1 | 10/2014 | Miyairi |
| 2015/0033691 A1 | 2/2015 | Shibata et al. |
| 2015/0037532 A1 | 2/2015 | Shibata et al. |
| 2015/0096274 A1* | 4/2015 | Shibata ................ B01D 46/247 55/523 |
| 2015/0182900 A1 | 7/2015 | Shibata et al. |
| 2017/0197167 A1* | 7/2017 | Shibata .................. B01D 39/20 |

FOREIGN PATENT DOCUMENTS

| | | |
|---|---|---|
| JP | 2015-029941 A | 2/2015 |
| JP | WO 2014/054706 | 8/2016 |

* cited by examiner

US 10,696,010 B2

PLUGGED HONEYCOMB STRUCTURE AND PLUGGED HONEYCOMB SEGMENT

The present application is an application based on JP 2015-172705 filed on Feb. 9, 2015 with the Japan Patent Office, the entire contents of which are incorporated herein by reference.

BACKGROUND OF THE INVENTION

Field of the Invention

The present invention relates to a plugged honeycomb structure and a plugged honeycomb segment. More particularly the present invention relates to a plugged honeycomb structure and a plugged honeycomb segment improved in a PM accumulation limit.

Description of the Related Art

In recent years, there has been a demand for the reduction in a fuel consumption of an automobile from the viewpoints of influences on the global environment and resource saving. This leads to a tendency of using internal combustion engines with a good thermal efficiency, such as a direct injection type gasoline engine and a diesel engine, as a power source for an automobile.

Meanwhile, these internal combustion engines have a problem that a soot is generated during a combustion of the fuel. A countermeasure has been then required from the viewpoint of an air environment to remove toxic components included in an exhaust gas and to avoid the emission of a particulate matter (hereinafter this may be called "a PM"), such as a soot or an ash, to the air.

Especially there is a global tendency of tightening the regulations on a removal of the PM emitted from a diesel engine. Then a honeycomb-structured wall flow type exhaust gas purification filter has attracted the attention as a trapping filter (this may be called a "DPF") to remove the PM, and various systems for the filter have been proposed. Such a DPF is typically configured so that a plurality of cells serving as a through channel of a fluid is defined by a porous partition wall, and by plugging the cells alternately, the porous partition wall making up the cells functions as a filter. A pillar-shaped structure including a plurality of cells defined by a porous partition wall may be called a "honeycomb structure". Then a honeycomb structure including cells whose open ends are plugged with plugging portions may be called a "plugged honeycomb structure". A plugged honeycomb structure is widely used as a trapping filter, such as a DPF. As an exhaust gas containing a particulate matter flows into the plugged honeycomb structure from the inflow end face (first end face) of the plugged honeycomb structure, the particulate matter in the exhaust gas is filtered when the exhaust gas passes through the partition wall, and the purified gas is emitted from the outflow end face (second end face) of the plugged honeycomb structure.

Conventionally a plugged honeycomb structure includes the cells, such as quadrangular cells, hexagonal cells, and HAC cells (cells having the geometry that is the combination of octagons and quadrangles). Recently new plugged honeycomb structures which include the combination of cells of different shapes or devise the position of plugging have been developed (see Patent Documents 1 and 2). Such plugged honeycomb structures allow a pressure loss at the initial stage of use to be reduced, and allow a pressure loss when a PM is accumulated to be reduced, and then allow cracks during burning of the PM to be suppressed and a lot of ash at the partition wall to be accumulated.

[Patent Document 1] JP-A-2014-200741
[Patent Document 2] JP-A-2015-029939

SUMMARY OF THE INVENTION

When a plugged honeycomb structure having a special shape of cells as shown in Patent Documents 1 and 2 is provided as a DPF in an internal combustion engine of an automobile or the like, such a plugged honeycomb structure typically is manufactured to have a round pillar shape of a certain size. The following manufacturing method is proposed as one of the methods to manufacture a round pillar-shaped plugged honeycomb structure. Firstly, a plurality of honeycomb segments, which has partition walls to form special cells (having a special shape) and a segment circumferential wall to surround the circumference of the special cells, is prepared. Next, the pluralities of honeycomb segments are bonded with a bonding material to prepare a bonded member of the honeycomb segments (hereinafter called a "honeycomb-segment bonded member"). Next, the circumference of the honeycomb-segment bonded member is ground into an arbitrary shape, and then the circumference is subjected to a coating treatment to manufacture a plugged honeycomb structure. Hereinafter a plugged honeycomb structure manufactured by such a method may be called a "plugged honeycomb structure having a segmented structure".

When such a segment-structured plugged honeycomb structure is used as a trapping filter to remove a PM, a regeneration treatment has to be performed after the PM is trapped for a certain period so as to burn and remove the PM accumulated at the trapping filter. Especially when it is used for a diesel engine, it is very important to burn and remove the PM accumulated at the trapping filter (DPF). When the PM is burnt, the temperature of the exhaust gas is caused to rise intentionally, and the fuel is used for such raising the temperature. Therefore if the DPF can be regenerated in the state where more PM is accumulated in the DPF, the frequency of a regeneration can be decreased, which can lead to an improvement in a fuel consumption. However, if a lot of PM accumulated in the DPF is burnt, the combustion temperature of the DPF increases, which leads to a problem of a breakage of the DPF. The maximum allowable amount of a PM accumulation to avoid a breakage of a DPF when the DPF is regenerated is called a PM accumulation limit, and a plugged honeycomb structure with an improved PM accumulation limit has been required.

The present invention has been developed in view of such problems of the conventional technologies, the present invention provides a plugged honeycomb structure improved in a PM accumulation limit and such a plugged honeycomb segment.

As a result of further investigations to solve the aforementioned problems, the present inventors obtained the following findings. It was found that, in a honeycomb segment having a specific cell arrangement pattern, devising the shape of the portion on the side of the circumference of the honeycomb segment can improve the PM accumulation limit. That is, it was found that the open frontal area in the circumferential region of the honeycomb segment is smaller than the open frontal area in the center region, which can lead to the improvement in the PM accumulation limit of a plugged honeycomb structure without changing the cell shape of each of the honeycomb segments. The present invention provides the following plugged honeycomb structure and plugged honeycomb segment.

According to a first aspect of the present invention, a plugged honeycomb structure is provided, comprising:

a plurality of prismatic columnar shaped honeycomb segments, each having porous partition walls that define a plurality of cells extending from an inflow end face to which a fluid flows to an outflow end face from which a fluid flows, and a segment circumferential wall disposed at an outermost circumference of each of the honeycomb segments;

a bonding layer to bond the side surfaces of the plurality of honeycomb segments; and plugging portions disposed in open ends of predetermined cells in the inflow end face of each of the honeycomb segments and in open ends of residual cells in the outflow end face of each of the honeycomb segments, wherein each of the honeycomb segments is configured so that the cells having at least two kinds of different shapes are disposed in a cross section orthogonal to an extension direction of the cells, each of the honeycomb segments has a center region including a center of the cross section orthogonal to the extension direction of the cells and a circumferential region located in the side of the circumference of the center region, the center region has a cell arrangement pattern such that inflow cells in which the plugging portions are disposed in the open ends of the cells in the outflow end face surround one outflow cell in which the plugging portions are disposed in open ends of the cell in the inflow end face, in the inflow end face of at least one of the honeycomb segments, the circumferential region is configured to have an open frontal area that is smaller than an open frontal area of the center region, a thickness of the segment circumferential wall of each of the honeycomb segments is from 0.3 to 1.0 mm, and a thickness of the bonding layer is from 0.5 to 1.5 mm.

According to a second aspect of the present invention, the plugged honeycomb structure according to the first aspect is provided, wherein each of the honeycomb segments is configured so that the cells having at least two kinds of different shapes have a predetermined repeated arrangement pattern.

According to a third aspect of the present invention, the plugged honeycomb structure according to the first or second aspects is provided, wherein center region cells disposed at the center region include two kinds or more of the cells that are different in shape of the cross section.

According to a fourth aspect of the present invention, the plugged honeycomb structure according to any one of above first to third aspects is provided, wherein a value obtained by subtracting a value of an open frontal area in the circumferential region from a value of an open frontal area in the center region is 10% or more.

According to a fifth aspect of the present invention, a plugged honeycomb segment is provided, comprising:

a prismatic columnar shaped honeycomb segment having porous partition walls that define a plurality of cells extending from an inflow end face to which a fluid flows to an outflow end face from which a fluid flows, and a segment circumferential wall disposed at an outermost circumference of each of the honeycomb segments; and plugging portions disposed in open ends of predetermined cells in the inflow end face of each of the honeycomb segments and in open ends of residual cells in the outflow end face of each of the honeycomb segments, wherein each of the honeycomb segments is configured so that the cells having at least two kinds of different shapes are disposed in a cross section orthogonal to an extension direction of the cells, each of the honeycomb segments has a center region including a center of the cross section orthogonal to the extension direction of the cells and a circumferential region located in the side of the circumference of the center region, the center region has a cell arrangement pattern such that inflow cells in which the plugging portions are disposed in open ends of the cells in the outflow end face surround one outflow cell in which the plugging portions are disposed in open ends of the cell in the inflow end face, in the inflow end face of the honeycomb segments, the circumferential region is configured to have an open frontal area that is smaller than an open frontal area of the center region, and a thickness of the segment circumferential wall of each of the honeycomb segments is from 0.3 to 1.0 mm.

According to a sixth aspect of the present invention, the plugged honeycomb segment according to above the fifth aspect is provided, wherein each of the honeycomb segments is configured so that the cells having at least two kinds of different shapes have a predetermined repeated arrangement.

According to a seventh aspect of the present invention, the plugged honeycomb segment according to the fifth or sixth aspects is provided, wherein center region cells disposed in the center region include two kinds or more of the cells that are different in shape of the cross section.

According to an eighth aspect of the present invention, the plugged honeycomb segment according to any one of the fifth to seventh aspects is provided, wherein a value obtained by subtracting a value of an open frontal area in the circumferential region from a value of an open frontal area at the center region is 10% or more.

A plugged honeycomb structure of the present invention is a so-called plugged honeycomb structure having a segmented structure, in which the center region of each of the honeycomb segments has a specific cell arrangement pattern. In the plugged honeycomb structure of the present invention, in the inflow end face of each of the honeycomb segments, a circumferential region is configured to define its open frontal area smaller than an open frontal area of a center region. Furthermore, in the plugged honeycomb structure of the present invention, a thickness of the segment circumferential wall of each of the honeycomb segments is from 0.3 to 1.0 mm, and a thickness of the bonding layer is from 0.5 to 1.5 mm. The thus configured plugged honeycomb structure can improve the PM accumulation limit.

A plugged honeycomb segment of the present invention is used for manufacturing a plugged honeycomb structure of the present invention. A plurality of the plugged honeycomb segments of the present invention is used and a plugged honeycomb structure improved in a PM accumulation limit can be very simply manufactured by bonding the side surfaces of a plurality of plugged honeycomb segments of the present invention each other with a bonding layer.

DESCRIPTION OF THE PREFERRED EMBODIMENTS

Figure 1:
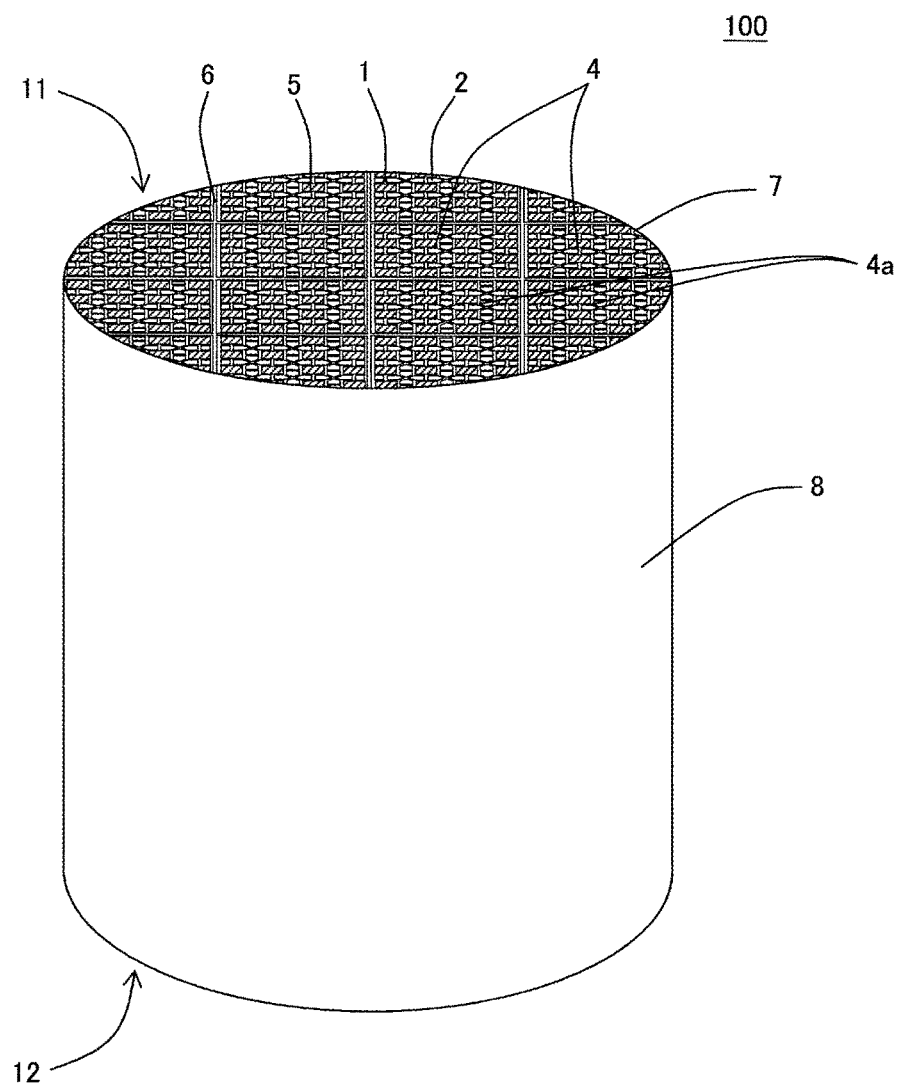
FIG. 1 is a schematic perspective view showing the first embodiment of a plugged honeycomb structure according to the present invention when viewed from its inflow-side end face.

Hereinafter, embodiments of the present invention will be described. The present invention is not limited to the embodiments below, and the embodiments below can be, of course, appropriately modified and improved based on the general knowledge of the person skilled in the art without departing from the spirit of the present invention. Then, these modifications and improvements are also included in the scope of the present invention.

(1) Plugged honeycomb structure:

As shown in FIGS. 1 through 5, a plugged honeycomb structure of the first embodiment of the present invention is a plugged honeycomb structure 100 that includes a plurality of honeycomb segments 4, a bonding layer 6, and plugging portions 5. That is, the plugged honeycomb structure 100 according to the present embodiment is a so-called plugged honeycomb structure having a segmented structure. The plugged honeycomb structure 100 further includes an outer wall 8 at the circumference so as to surround the plurality of honeycomb segments 4.

Figure 2:
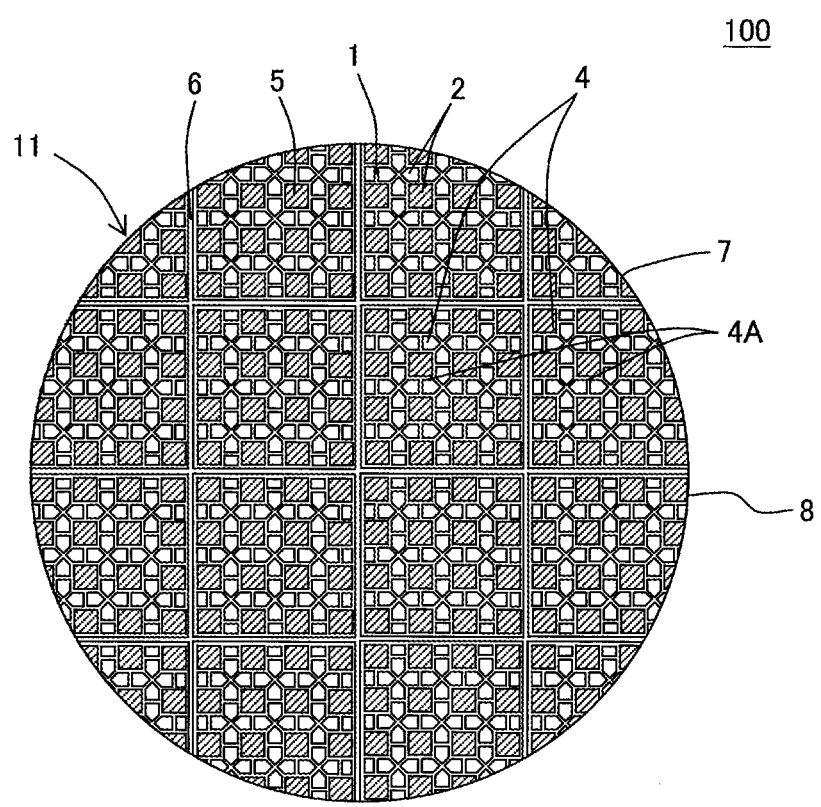
FIG. 2 is a schematic plan view showing the first embodiment of the plugged honeycomb structure according to the present invention when viewed from its inflow-side end face.
Figure 3:
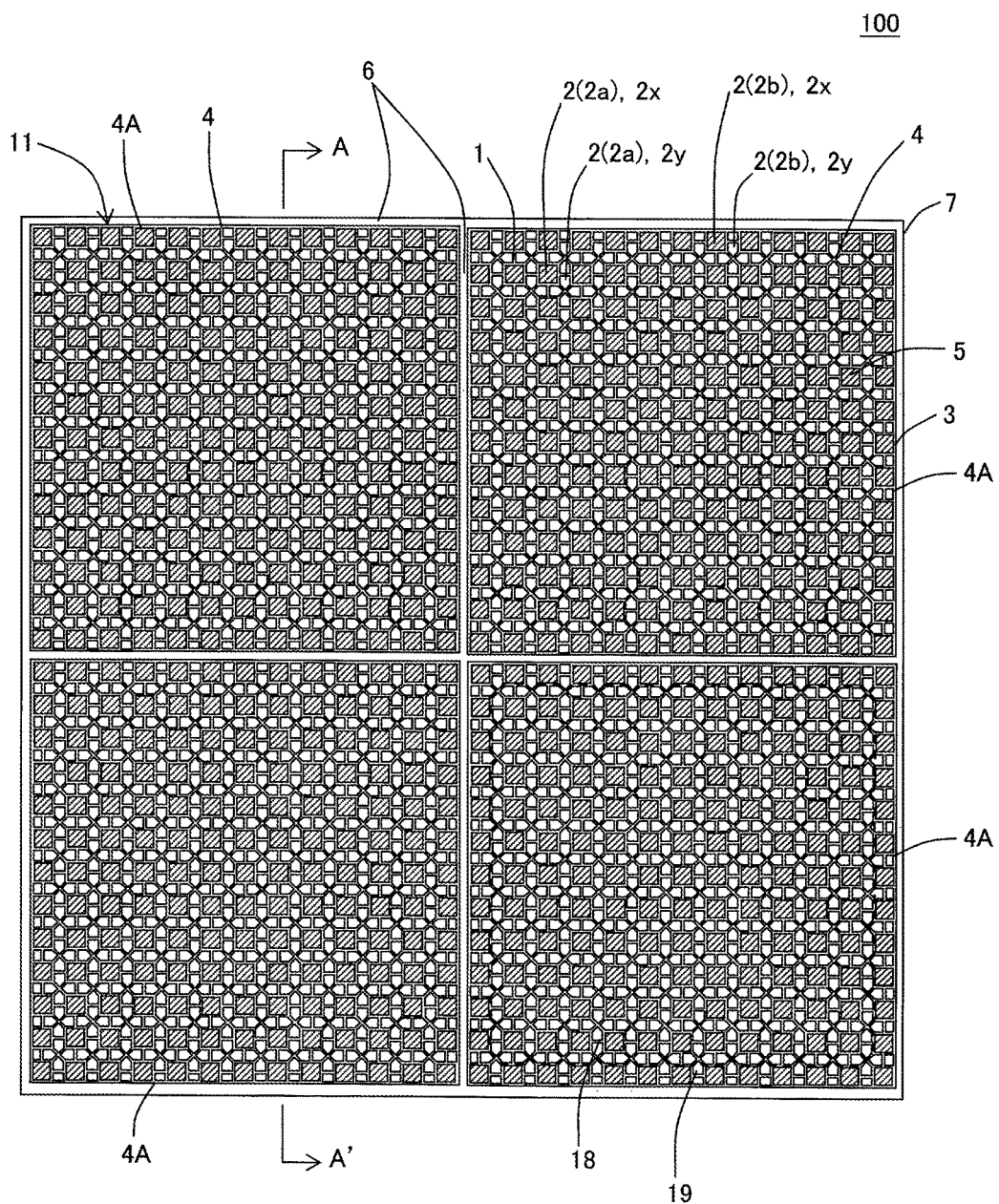
FIG. 3 is an enlarged plan view of a part of the inflow end face of the plugged honeycomb structure shown in FIG. 2.
Figure 4:
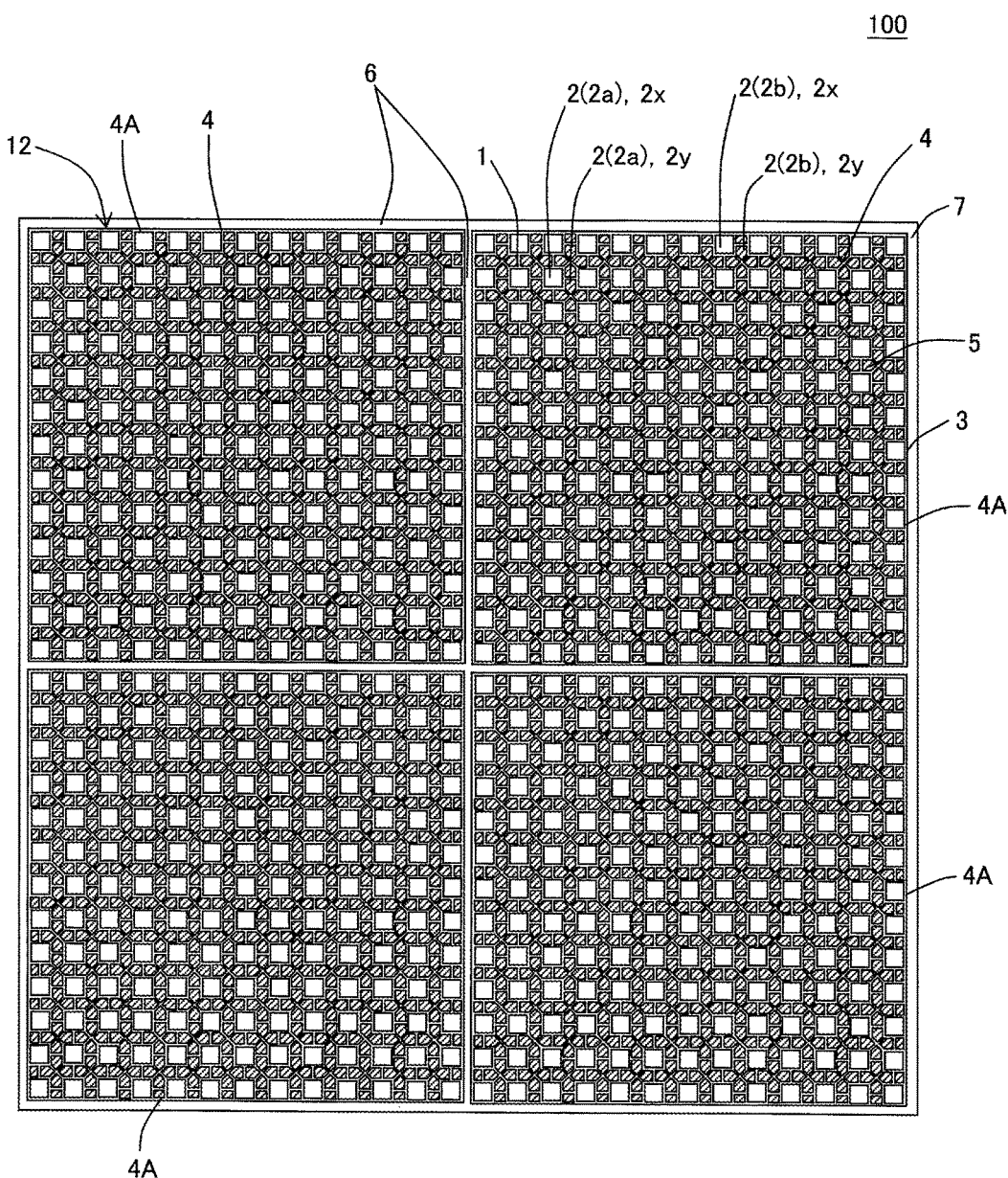
FIG. 4 is an enlarged plan view of a part of the outflow end face of the plugged honeycomb structure shown in FIG. 2.
Figure 5:
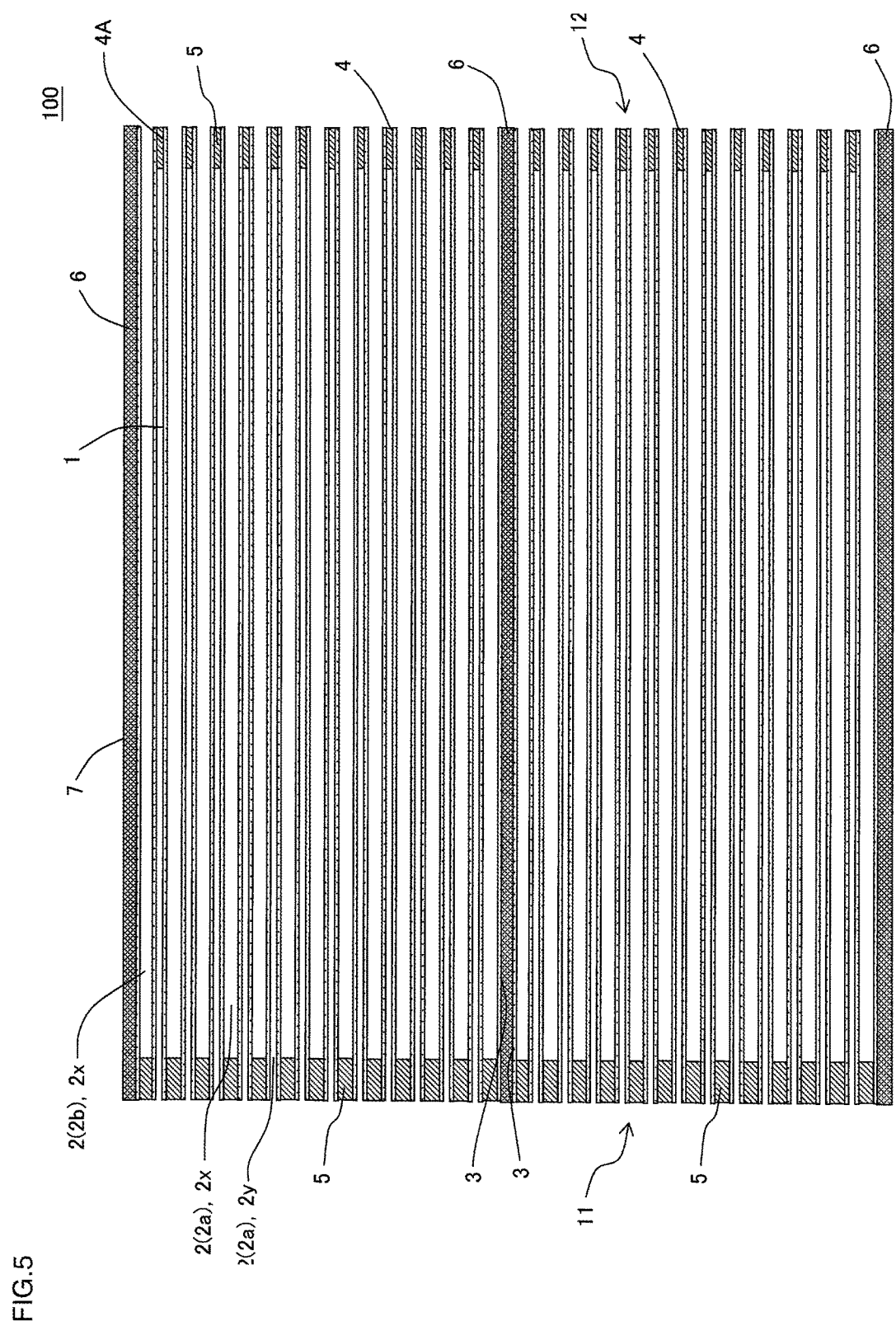
FIG. 5 is a schematic cross-sectional view taken along the line A-A' of FIG. 3.
Figure 6:
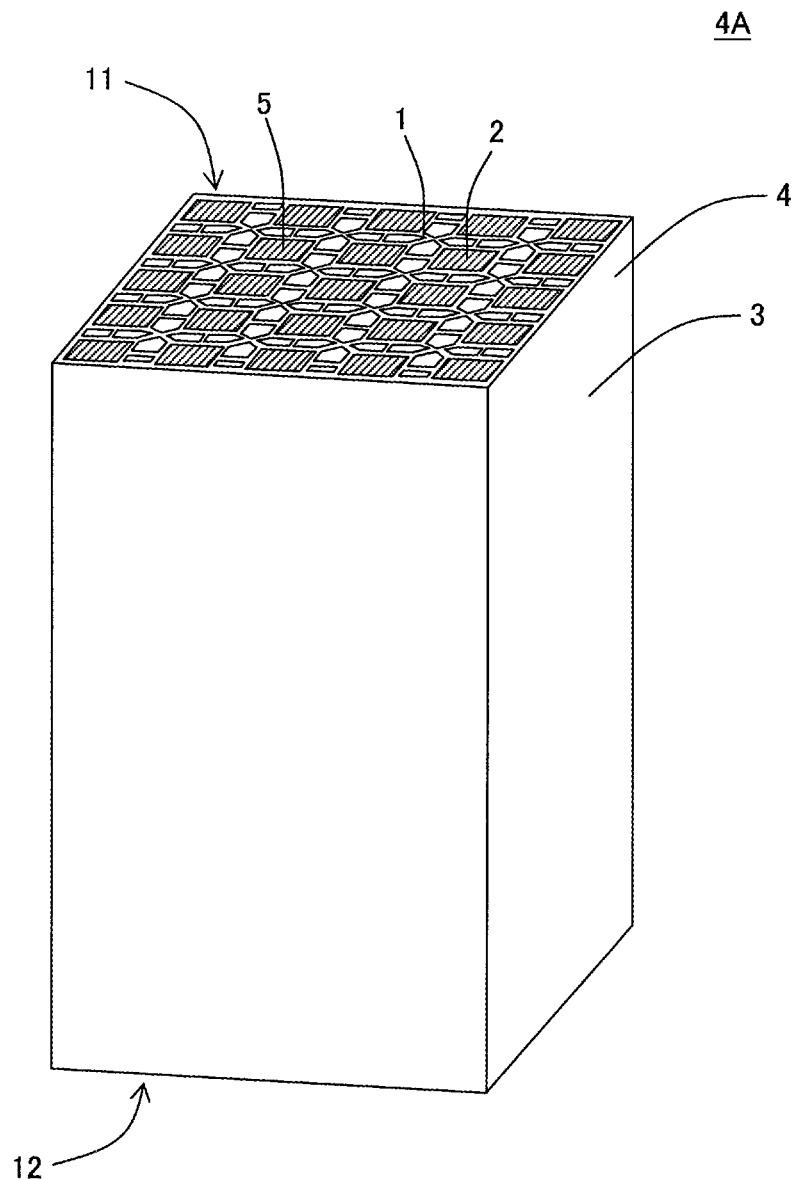
FIG. 6 is a schematic perspective view showing a plugged honeycomb segment included in the plugged honeycomb structure shown in FIG. 1 when viewed from the inflow-side end face.
Figure 7:
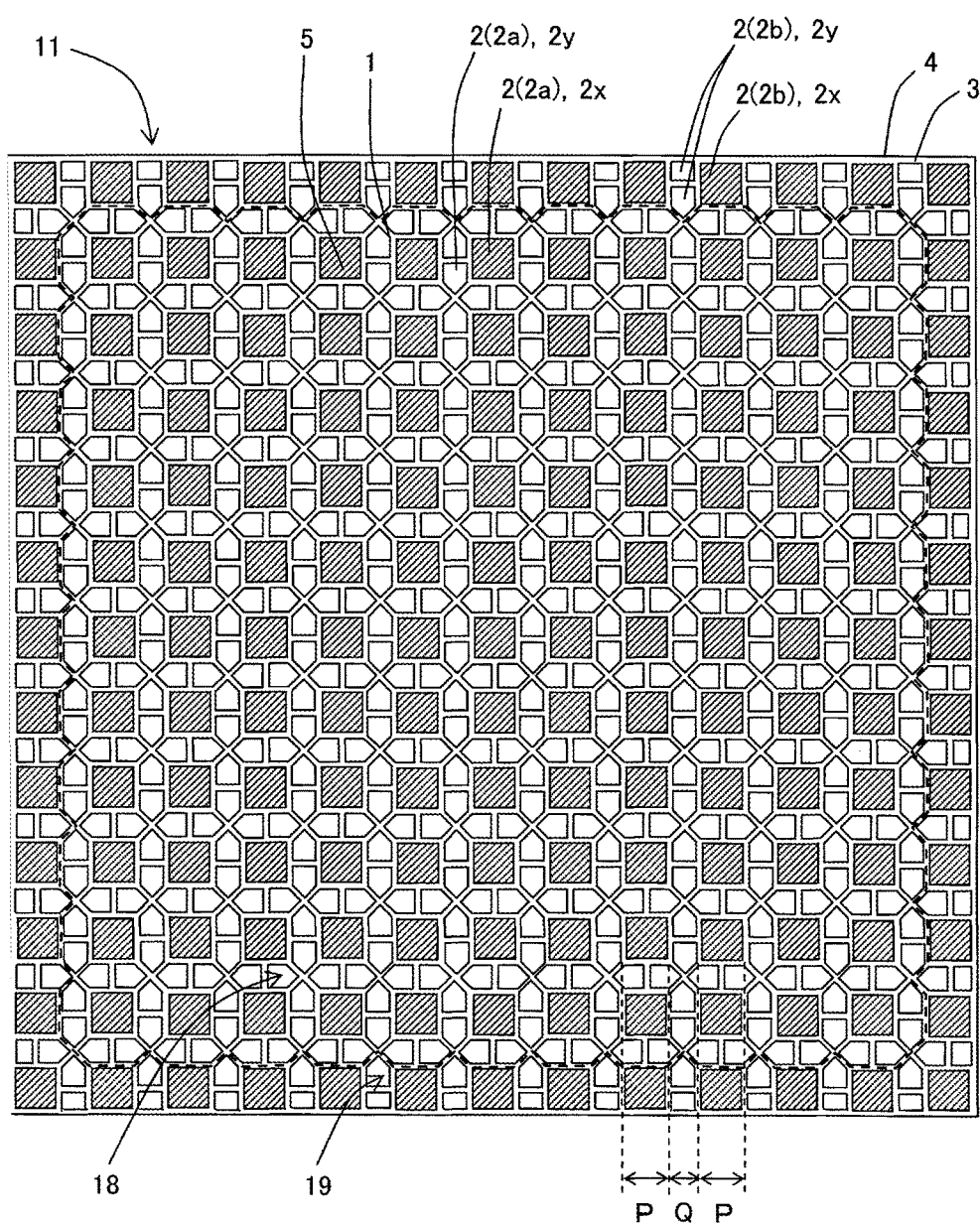
FIG. 7 is a schematic plan view showing the plugged honeycomb segment included in the plugged honeycomb structure shown in FIG. 1 when viewed from the inflow-side end face.
Figure 8:
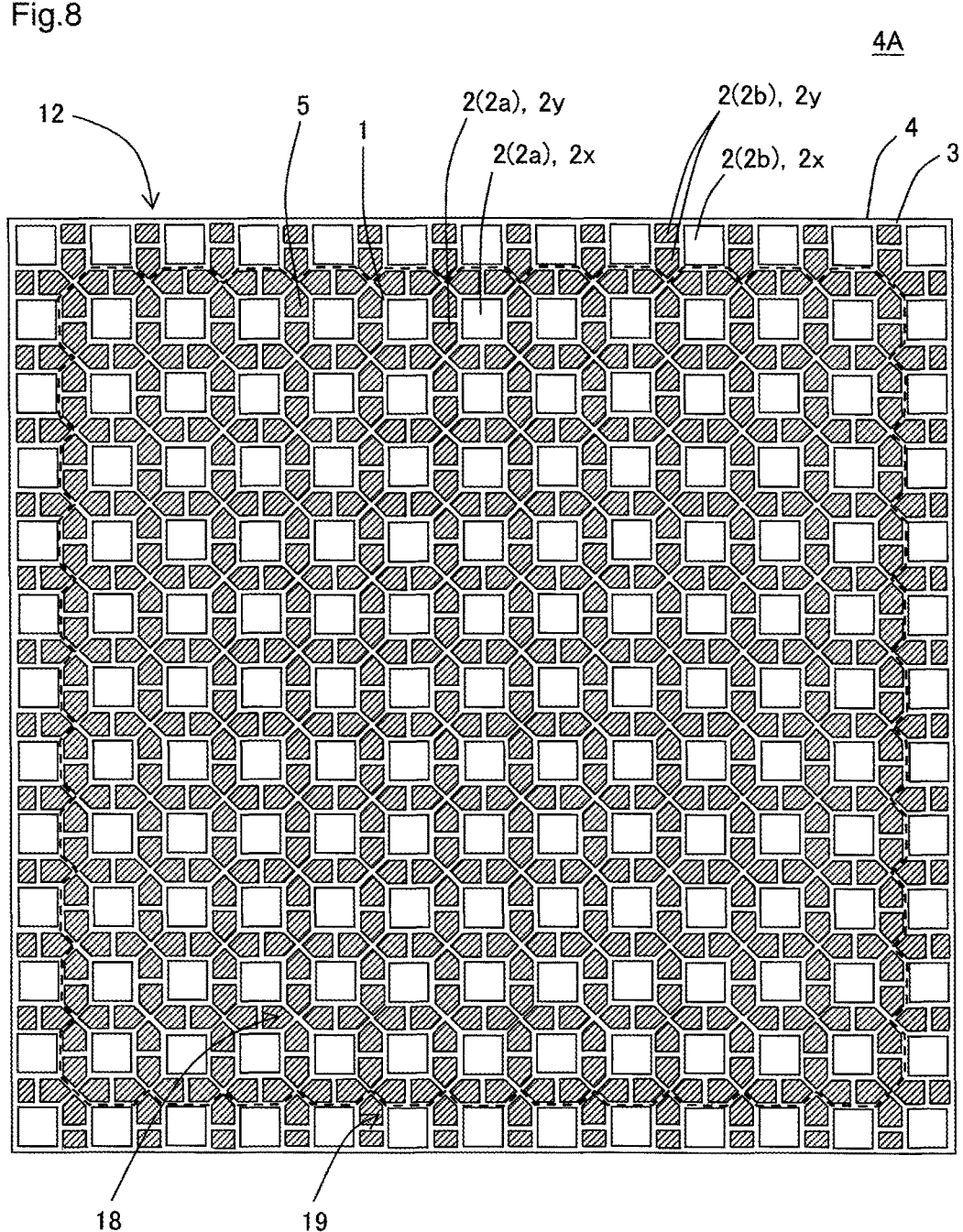
FIG. 8 is a schematic plan view showing the plugged honeycomb segment included in the plugged honeycomb structure shown in FIG. 1 when viewed from the outflow-side end face.

Herein, FIG. 1 is a schematic perspective view showing the first embodiment of a plugged honeycomb structure according to the present invention when viewed from its inflow-side end face. FIG. 2 is a schematic plan view showing the first embodiment of the plugged honeycomb structure according to the present invention when viewed from its inflow-side end face. FIG. 3 is an enlarged plan view of a part of the inflow end face of the plugged honeycomb structure shown in FIG. 2. FIG. 4 is an enlarged plan view of a part of the outflow end face of the plugged honeycomb structure shown in FIG. 2. FIG. 5 is a schematic cross-sectional view taken along the line A-A' of FIG. 3. Furthermore, FIG. 6 is a schematic perspective view showing a plugged honeycomb segment included in the plugged honeycomb structure shown in FIG. 1 when viewed from the inflow-side end face. FIG. 7 is a schematic plan view showing the plugged honeycomb segment included in the plugged honeycomb structure shown in FIG. 1 when viewed from the inflow-side end face. FIG. 8 is a schematic plan view showing the plugged honeycomb segment included in the plugged honeycomb structure shown in FIG. 1 when viewed from the outflow-side end face.

As shown in FIGS. 6 through 8, a honeycomb segment 4 includes porous partition walls 1 which define a plurality of cells 2 extending from an inflow end face 11 into which a fluid flows to an outflow end face 12 from which a fluid flows, and a segment circumferential wall 3 disposed at the outermost circumference. As shown in FIGS. 1 through 5, the plugged honeycomb structure 100 of the present embodiment includes a plurality of the honeycomb segments 4, and the side surfaces of the plurality of honeycomb segments 4 are bonded to each other via the bonding layer 6. In the plugged honeycomb structure 100 of the present embodiment, honeycomb segments 4 among the plurality of honeycomb segments 4 which are disposed in a center part and are not in contact with the outer wall 8 have a prismatic columnar shape, where the direction from the inflow end face 11 to the outflow end face 12 is the axial direction. Honeycomb segments 4 among the plurality of honeycomb segments 4 which are disposed at the circumferential part in contact with the outer wall 8 are formed into a pillar shape, in which a part of the honeycomb segment 4 which is formed into a prismatic columnar shape is ground to follow the shape of the outer wall 8.

The bonding layer 6 is prepared by a bonding material to bond the side surfaces of the plurality of honeycomb segments 4. A bonded member obtained by bonding the plurality of honeycomb segments 4 via the bonding layer 6 may be called a honeycomb-segment bonded member 7.

The plugging portions 5 are disposed in the open ends of the cells 2 formed in each of the honeycomb segments 4, and they plug either one of the open end on the side of the inflow end face 11 and the open end on the side of the outflow end face 12. That is, the plugging portions 5 are disposed in the open ends of predetermined cells 2x in the inflow end face 11 of each of the honeycomb segments 4 and in the open ends of residual cells 2y other than the predetermined cells 2x in the outflow end face 12 of the honeycomb segment. Hereinafter a cell 2 with the plugging portions 5 disposed in the open end thereof on the inflow end face 11 of the honeycomb segment 4 (i.e., the predetermined cell 2x as described above) may be called an "outflow cell 2x". Then a cell 2 with the plugging portions 5 disposed in the open end thereof on the outflow end face 12 of the honeycomb segment 4 (i.e., the residual cell 2y as described above) may be called an "inflow cell 2y". A honeycomb segment 4 with the plugging portions 5 disposed in the open ends of the cells 2 may be called a plugged honeycomb segment 4A.

Each of the honeycomb segments 4 is configured so that cells having at least two kinds of different shapes are formed in a cross section orthogonal to the extension direction of the cells 2. For example, the honeycomb segment 4 shown in FIGS. 6 through 8 includes cells 2 of two kinds of different shapes, whose shape of cell is a quadrangular shape (e.g., outflow cells 2x) and a pentagonal shape (e.g., inflow cells 2y). Hereinafter the shape of the cells 2 in a cross section orthogonal to the extension direction of the cells 2 may be called a "cell shape", a "cross-sectional shape" and a "shape of a cross section".

In the plugged honeycomb structure 100 of the present embodiment, a thickness of the segment circumferential wall 3 of each of the honeycomb segments 4 is from 0.3 to 1.0 mm, and a thickness of the bonding layer 6 is from 0.5 to 1.5 mm.

The honeycomb segment 4 has a center region 18 including a center of the cross section orthogonal to the extension direction of the cells 2 and a circumferential region 19 positioned in the side of the circumference of the center region 18. In FIGS. 7 and 8, the center region 18 of the honeycomb segment 4 is inside the region surrounded by the dotted line, and the circumferential region 19 of the honeycomb segment 4 is outside the region surrounded by the dotted line. Moreover, the boundary between the center region 18 and the circumferential region 19 of the honeycomb segment 4 is formed by the partition wall 1 that defines cells formed in the center region 18 (center region cells 2a) and cells formed in the circumferential region 19 (circumferential region cells 2b). Specifically the boundary between the center region 18 and the circumferential region 19 is at a position in the thickness of the partition wall 1 that defines the center region cells 2a and the circumferential region cells 2b at the intermediate distance from the center region cells 2a and the circumferential region cells 2b (at an equal distance). Therefore the center region 18 is an inside region that is at a position in the thickness of the partition wall 1 and is defined by connecting the positions at the intermediate distance (equal distance) from the center region cells 2a and the circumferential region cells 2b.

The center region 18 is a region having a cell arrangement pattern such that inflow cells 2y surround one outflow cell 2x. Then the circumferential region 19 is outside the center region 18, which does not have a cell arrangement pattern in the center region 18 as described above. For example, in the honeycomb segment 4 shown in FIGS. 6 through 8, the plugging portions 5 are disposed so that inflow cells 2y that a shape of cells 2 is a pentagonal shape surround an outflow cell 2x that a shape of cells 2 is a quadrangular shape. With this configuration, the center region 18 has a cell arrangement pattern such that the inflow cells 2y surround the outflow cell 2x. Herein the "inflow cells 2y surround an outflow cell 2x" means the following configuration in a cross section orthogonal to the extension direction of the cells 2. The following describes an example where the cell shape of the outflow cells 2x is a quadrangular shape as shown in FIGS. 6 through 8. Firstly one side of an inflow cell 2y is arranged to be adjacent to each of the four sides of one outflow cell 2x. In this case, one side of each of two or more inflow cells 2y may be arranged to be adjacent to one side of one outflow cell 2x. That is, one side of one of the inflow cells 2y may be arranged to be adjacent to one side of the one outflow cell 2x at the position of a half of the one side, and then one side of another inflow cell 2y may be arranged to be adjacent to the one side of the one outflow cell 2x at the position of the remaining half of the one side. Then all of the inflow cells 2y adjacent to the one outflow cell 2x are disposed so that these inflow cells 2y are adjacent to each other at their mutual one side. The geometry of the inflow cells 2y in such a state refers to the "inflow cells 2y surround an outflow cell 2x".

In the plugged honeycomb structure 100 of the present embodiment, at least one honeycomb segment 4 (specifically a plugged honeycomb segment 4A) is configured as follows. In the inflow end face 11 of the honeycomb segment 4, the circumferential region 19 is configured to have an open frontal area that is smaller than an open frontal area of the center region 18. The plugged honeycomb structure 100 of the present embodiment can be preferably used as a trapping filter to remove a particulate matter included in an exhaust gas. Then, the thus configured plugged honeycomb structure can improve the PM accumulation limit. That is, the plugged honeycomb structure 100 of the present embodiment can increase the maximum allowable PM accumulation amount to avoid the breakage of the plugged honeycomb structure as compared with the following plugged honeycomb structures A, B when the plugged honeycomb structure 100 is regenerated. In the plugged honeycomb structure A, in the inflow end face 11 of the honeycomb segment 4, the circumferential region 19 has a same open frontal area as that of the center region 18. In the plugged honeycomb structure B, the circumferential region 19 is configured to have an open frontal area that is larger than an open frontal area of the center region 18. For example, in a conventional plugged honeycomb structure having a segmented structure, the "arrangement of cells (in other words, continuity of the repeating unit of cells)" among the honeycomb segments of a honeycomb-segment bonded member has not been seen as a problem especially. For example, in the case of all of the cells of a plugged honeycomb structure having the same quadrangular shape, the minimum repeating unit of the cells is one cell. The plugged honeycomb structure 100 of the present embodiment can increase the maximum allowable PM accumulation amount as described above as compared with such a plugged honeycomb structure that a shape of all cells is the same quadrangular shape. Hereinafter, in a honeycomb segment, in the inflow end face 11 of the honeycomb segment 4, the circumferential region 19 is configured to have an open frontal area that is smaller than an open frontal area of the center region 18 may be called a "specific honeycomb segment".

Figure 9:
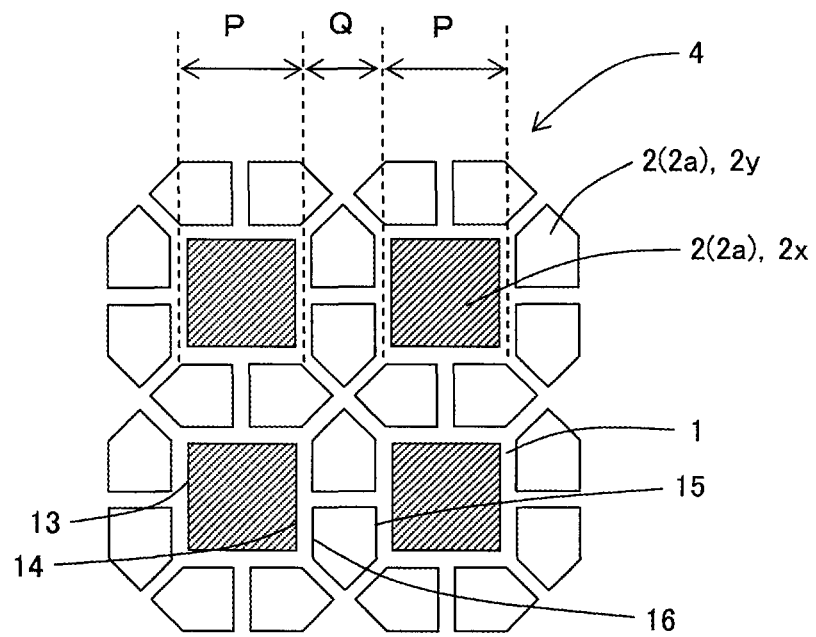
FIG. 9 is a schematic partially enlarged view showing the first embodiment of the plugged honeycomb structure according to the present invention when viewed from the inflow-side end face.

As shown in FIGS. 6 through 8, in the inflow cells 2y formed in the honeycomb segment 4, an apparent cross-sectional shape orthogonal to the center axial direction of the inflow cells 2y is a substantially pentagon. Then, in the outflow cells 2x formed in the honeycomb segment 4, an apparent cross-sectional shape orthogonal to the center axial direction of the outflow cells 2x is a substantially square. Herein, the "cross-sectional shape" refers to a shape appearing in the cross section when the cells 2 are cut along a plane orthogonal to the center axial direction, and refers to the shape of a part surrounded by the partition wall 1 defining the cells 2. In the honeycomb segment 4 shown in FIGS. 6 through 8, the outflow cells 2x having a substantially square cross-sectional shape have a relatively larger cross-sectional area than that of the inflow cells 2y having a substantially pentagonal cross-sectional shape. In the circumferential region 19 of the plugged honeycomb segment 4A, the existing ratio of the outflow cells 2x which have a relatively large cross-sectional area is high. As a result, the plugged honeycomb segment 4A is configured so that, in the inflow end face 11, the circumferential region 19 has an open frontal area that is smaller than an open frontal area of the center region 18. For example, in the case where the distance P shown in FIG. 9 is 2 mm, the distance Q is 1.2 mm, the thickness of the partition wall 1 is 0.32 mm, and the length of one side of the honeycomb segment 4 in the inflow end face 11 is 41 mm, the open frontal area in the center region 18 is 35.4%, and the open frontal area in the circumferential region 19 is 23.8%. Furthermore, in the case where the distance P shown in FIG. 9 is 2 mm, the distance Q is 1.2 mm, the thickness of the partition wall 1 is 0.32 mm, and the length of one side of the honeycomb segment 4 in the inflow end face 11 is 40 mm, the open frontal area in the center region 18 is 35.4%, and the open frontal area in the circumferential region 19 is 22.2%.

As shown in FIGS. 1 through 5, when the plugged honeycomb structure 100 includes a plurality of honeycomb segments 4, it includes honeycomb segments 4 disposed in a center part that is not in contact with the outer wall 8 and honeycomb segments 4 that are in contact with the outer wall 8. Hereinafter, the honeycomb segments 4 disposed in a center part that is not in contact with the outer wall 8 are called center segments, and the honeycomb segments 4 that are in contact with the outer wall 8 are called circumferential segments. In the plugged honeycomb structure 100 of the present embodiment, at least one center segment is preferably a specific honeycomb segment, and all of the center segments are specific honeycomb segments more preferably. As described above, in a specific honeycomb segment, a thickness of the segment circumferential wall 3 of each of the honeycomb segments is from 0.3 to 1.0 mm. The plugged honeycomb structure 100 shown in FIGS. 1 through 5 shows an example where all of the center segments are specific honeycomb segments.

The honeycomb segment 4 is preferably configured so that cells 2 having at least two kinds of different shapes have a predetermined repeated arrangement pattern. The "repeated arrangement pattern" as described above refers to an arrangement pattern including at least one outflow cell $2x$ and at least one inflow cell $2y$, in which two or more of such arrangement patterns are present in one honeycomb segment 4. In the honeycomb segment 4 shown in FIGS. 6 through 8, the cell arrangement pattern in the center region 18 has a predetermined repeated arrangement pattern. Therefore, the cell arrangement pattern in the center region 18 is a "repeated arrangement pattern".

In the present specification, the open frontal area in the center region 18 can be obtained by the following method. Firstly, the area of the center region 18 in the inflow end face 11 of the honeycomb segment 4 is obtained. The center region 18 is a region having a cell arrangement pattern such that inflow cells $2y$ surround one outflow cell $2x$, and the area of the center region 18 can be obtained by a known method, such as an image analysis. Herein the area of the center region 18 includes the area of the partition wall 1, the area of the plugging portions 5 disposed in the open ends of the outflow cells $2x$ and the area of the open ends of the inflow cells $2y$ (open end area) existing in the center region 18 of the inflow end face 11. The boundary between the center region 18 and the circumferential region 19 is at a position in the thickness of the partition wall 1 that divides the center region cells $2a$ and the circumferential region cells $2b$ at the intermediate distance from the center region cells $2a$ and the circumferential region cells $2b$ (at an equal distance). Next, the open end area of the inflow cells $2y$ formed in the center region 18 of the inflow end face 11 is obtained. The open end area of the inflow cells $2y$ formed in the center region 18 of the inflow end face 11 can be obtained by a known method, such as an image analysis. Then, the percentage of the value obtained by dividing the open end area S1 of the inflow cells $2y$ formed in the center region 18 of the inflow end face 11 by the area S2 of the center region 18 (S1/S2×100) is the open frontal area of the center region 18.

In the present specification, the open frontal area in the circumferential region 19 can be obtained by the following method. Firstly, the area of the circumferential region 19 in the inflow end face 11 of the honeycomb segment 4 is obtained. The circumferential region 19 is outside the center region 18, which does not have a cell arrangement pattern such that inflow cells $2y$ surround one outflow cell $2x$. The area of the circumferential region 19 can be obtained by a known method, such as an image analysis. Herein the area of the circumferential region 19 can be said an area obtained by subtracting the area of the center region 18 from the overall area of the inflow end face 11 of the honeycomb segment 4. Next, the open end area of the inflow cells $2y$ formed in the circumferential region 19 of the inflow end face 11 is obtained. The open end area of the inflow cells $2y$ formed in the circumferential region 19 of the inflow end face 11 can be obtained by a known method, such as an image analysis. Then, the percentage of the value obtained by dividing the open end area S3 of the inflow cells $2y$ formed in the circumferential region 19 of the inflow end face 11 by the area S4 of the circumferential region 19 (S3/S4×100) is the open frontal area of the circumferential region 19.

The value obtained by subtracting the value of the open frontal area in the circumferential region (the value of percentage) from the value of the open frontal area in the center region (the value of percentage) is preferably 10% or more, more preferably 13% or more and especially preferably 15% or more. Although the upper limit of the value obtained by subtracting the value of the open frontal area in the circumferential region from the value of the open frontal area in the center region is not limited especially, the upper limit may be 30%, for example. If the value obtained by subtracting the value of the open frontal area in the circumferential region from the value of the open frontal area in the center region is less than 10%, a difference between the open frontal area in the center region and the open frontal area in the circumferential region becomes small, which may lead to the difficulty to obtain a sufficient improvement of the PM accumulation limit.

The overall shape of the plugged honeycomb structure 100 is not limited especially. For example, the overall shape of the plugged honeycomb structure 100 shown in FIG. 1 is a round-pillar shape where the shape of the inflow end face 11 and the outflow end face 12 are circular. Although an overall shape is not shown, the overall shape of the plugged honeycomb structure may be a pillar shape, where the shape of the inflow end face and the outflow end face are substantially circular, including an ellipse, a race-track shape, or an oval. Alternatively, the overall shape of the plugged honeycomb structure may be a polygonal prismatic columnar shape, where the shape of the inflow end face and the outflow end face are a quadrangle, a hexagon or the like.

The material of the honeycomb segments is not limited especially, and main components preferably include various kinds of ceramics, such as oxides and non-oxides, and metals from the viewpoints of strength, heat resistance, durability and the like. Specifically, examples of the ceramics include cordierite, mullite, alumina, spinel, silicon carbide, silicon nitride, and aluminum titanate. Examples of the metals include Fe—Cr—Al based metals and metal silicon. A main component preferably includes one kind or two kinds or more selected from these materials. Particularly, a main component preferably includes one kind or two kinds or more selected from the group consisting of alumina, mullite, aluminum titanate, cordierite, silicon carbide, and silicon nitride from the viewpoints of high strength and high heat resistance. Silicon carbide or silicon-silicon carbide composite materials are particularly suitable from the viewpoints of high heat conductivity and high heat resistance. Herein, the "main component" means a component included in 50 mass % or more of the honeycomb segments, more preferably 70 mass % or more and further preferably 80 mass % or more.

The material of the plugging portions is not limited especially. The material of the plugging portions preferably includes one kind or two kinds or more selected from the various kinds of ceramics and metals described above for the suitable materials of the honeycomb segment.

The plugged honeycomb structure of the present embodiment includes a plurality of honeycomb segments (specifically plugged honeycomb segments) that are bonded to each other via the bonding layer. Such a configuration allows a thermal stress applied to the plugged honeycomb structure to be distributed, and cracks due to local temperature rise to be prevented effectively.

The size of the honeycomb segments is not limited especially. Note here that if the size of one honeycomb segment is too large, a sufficient effect of preventing cracks, which is an advantageous effect of the segment structure, may not be obtained. If the size of one honeycomb segment is too small, the bonding of the honeycomb segments with the bonding layer may be complicated.

The shape of the honeycomb segments is not limited especially. For example, examples of the shape of the honeycomb segments include a polygonal prismatic columnar shape, where the cross-sectional shape orthogonal to the axial direction of the honeycomb segment is a quadrangle, a hexagon or the like. Honeycomb segments disposed at the outermost circumference of the plugged honeycomb structure may have a prismatic columnar shape, a part of which is processed by grinding or the like in accordance with the overall shape of the plugged honeycomb structure.

Each of the honeycomb segments 4 in the plugged honeycomb structure 100 of the present embodiment has a repeated arrangement pattern of the cells such that eight inflow cells 2*y* having a substantially pentagonal cross-sectional shape surround one outflow cell 2*x* having a substantially square cross-sectional shape. By this configuration, the plugged honeycomb structure 100 of the present embodiment can make a filtration area of each honeycomb segments 4 larger than the conventional plugged honeycomb structures when they are used as a filter. Therefore a pressure loss can be reduced after the PM is accumulated. Further, in the thus configured honeycomb segment 4, the outflow cells 2*x* are not adjacent to each other, and the outflow cells 2*x* are surrounded entirely with the inflow cells 2*y*. This can increase the open frontal area of the outflow cells 2*x*, and can decrease the number of the outflow cells 2*x* compared with the number of the inflow cells 2*y*, so that the pressure loss during the initial stage of the operation of the plugged honeycomb structure 100 can be reduced.

Furthermore, as shown in FIGS. 1 through 5, the inflow cells 2*y* having a substantially pentagonal cross-sectional shape are not a regular pentagon in shape, but preferably have a so-called home plate shape, for example, whose inner angles are 90°, 135°, 90°, 90°, and 135° that are clockwise from one vertex. By this configuration, four inflow cells 2*y* are formed adjacent to each other so that corner portions at the sides of the tip ends of the home plate shapes are collected. In the four inflow cells 2*y* where corner portions at their tip ends of the home plate shapes are collected, two partition walls 1 are mutually composed perpendicularly. Therefore, a heat capacity of the partition walls 1 in the part of the collected corner portions can be kept high, and so a thermal stress can be absorbed when a PM is burnt.

As shown in FIG. 9, the distance P between the partition wall 1 defining a first side 13 of an outflow cell 2*x* and the partition wall 1 defining a second side 14 opposed to the first side 13 of the outflow cell 2*x* is preferably in the range of exceeding 0.8 mm and less than 2.4 mm. Herein, the distance P refers to the shortest distance connecting the center in the thickness direction of the partition wall 1 defining the first side 13 and the center in the thickness direction of the partition wall 1 defining the second side 14 opposed thereto. Furthermore, as shown in FIG. 9, the distance Q refers to the distance between the partition wall 1 defining a third side 15 of the inflow cell 2*y* that is adjacent substantially parallel to one side of the outflow cell 2*x* and the partition wall 1 defining a fourth side 16 opposed to the third side 15 of the inflow cell 2*y*. Then the ratio of the distance Q to the distance P is preferably in the range of exceeding 0.4 and less than 1.1. Herein, the distance Q refers to the shortest distance connecting the center in the thickness direction of the partition wall 1 defining the third side 15 and the center in the thickness direction of the partition wall 1 defining the fourth side 16 opposed thereto. The relationship between the distance P and the distance Q in the above range is preferable because it allows a pressure loss to be reduced while having a good balance during the initial stage and after the PM accumulation. FIG. 9 is a schematic partially enlarged view of the plugged honeycomb structure that is the first embodiment of the present invention when viewed from the side of the inflow end face of the plugged honeycomb structure.

A thickness of the segment circumferential wall of each of the honeycomb segments is from 0.3 to 1.0 mm, preferably from 0.3 to 0.8 mm, and particularly preferably from 0.4 to 0.6 mm. If the thickness of the segment circumferential wall of each of the honeycomb segments is less than 0.3 mm, it is not desirable that the strength of each of the honeycomb segments deteriorates. If the thickness of the segment circumferential wall of each of the honeycomb segments exceeds 1.0 mm, it is not desirable that a pressure loss increases.

A thickness of the bonding layer is from 0.5 to 1.5 mm, preferably from 0.7 to 1.3 mm, and particularly preferably from 0.8 to 1.2 mm. If the thickness of the bonding layer is less than 0.5 mm, it is not desirable that the PM accumulation limit may deteriorate. If the thickness of the bonding layer exceeds 1.5 mm, it is not desirable that a pressure loss may increase.

Furthermore, in the plugged honeycomb structure of the present embodiment, the cells formed in the center region (center region cells 2*a*) preferably include two kinds or more of cells that are different in cross-sectional shape. In the plugged honeycomb structure 100 shown in FIGS. 1 through 5, the outflow cells 2*x* having a substantially square cross-sectional shape are the center region cells 2*a* having a first cross-sectional shape, and the inflow cells 2*y* having a substantially pentagonal cross-sectional shape are the center region cells 2*a* having a second cross-sectional shape. By this configuration, the cells having at least two kinds or more of cross-sectional shapes preferably form a predetermined repeated arrangement pattern. When the cells have a polygonal cross-sectional shape, the corner portions of the polygon may have a curved shape having R. For example, a substantial square is the inclusive term of a square cross-sectional shape and a square cross-sectional shape having at least one corner portion that is a curved shape having R. Similarly a substantial pentagon is the inclusive term of a pentagonal cross-sectional shape and a pentagonal cross-sectional shape having at least one corner portion that is a curved shape having R.

A thickness of the partition wall 1 is not limited especially. For example, the thickness of the partition wall 1 that is present between one side of one of the cells 2 and one side of another cell 2 adjacent substantially parallel to the one cell 2 is preferably from 0.07 to 0.51 mm, more preferably from 0.10 to 0.46 mm and particularly preferably from 0.12 to 0.38 mm. If the thickness of the partition wall 1 is smaller than 0.07 mm, it is not desirable that this might cause the difficulty to form the honeycomb segments 4. If the thickness of the partition wall 1 is larger than 0.51 mm, this is not desirable from the viewpoints of acquiring enough filtration area and reducing a pressure loss.

In the plugged honeycomb structure of the present embodiment, one of the suitable examples includes each of the honeycomb segments having the following configuration. In the inflow cells 2$y$, a geometrical surface area GSA is preferably from 10 to 30 $cm^2/cm^3$, and more preferably from 12 to 18 $cm^2/cm^3$. The "geometrical surface area GSA" as described above refers to a value (S/V) obtained by dividing the overall inner surface area (S) of the inflow cells 2$y$ by the total volume (V) of the honeycomb segment. Since a larger filtration area of a filter typically leads to a decrease in a thickness of a PM accumulated at the partition wall, falling within such a numerical range of the geometrical surface area GSA allows the pressure loss of the plugged honeycomb structure to be low. Therefore, if the geometrical surface area GSA of the inflow cells 2$y$ is smaller than 10 $cm^2/cm^3$, it is not desirable that this might cause an increase in a pressure loss during a PM accumulation. If it is larger than 30 $cm^2/cm^3$, it is not desirable that this might cause the pressure loss at the initial stage to increase.

In the plugged honeycomb structure of the present embodiment, a cell open frontal area of the inflow cells 2$y$ is preferably from 20 to 70%, and more preferably from 25 to 65%. If the cell open frontal area of the inflow cells 2$y$ is smaller than 20%, it is not desirable that this might cause the pressure loss at the initial stage to increase. If it is larger than 70%, it is not desirable that this may cause the filtration rate to increase, which leads to a deterioration in a trapping efficiency of a PM, and further the strength of the partition wall 1 may deteriorate. The "cell cross-sectional open frontal area of the inflow cells 2$y$" refers to the ratio of "the total cross-sectional area of the inflow cells 2$y$" to the sum of "the cross-sectional area of the entire partition wall 1 formed in the plugged honeycomb structure" and "the total cross-sectional area of all of the cells 2" in a cross section perpendicular to the center axial direction of the plugged honeycomb structure.

In the plugged honeycomb structure of the present embodiment, a hydraulic diameter of each of the plurality of cells 2 is preferably from 0.5 to 2.5 mm, and more preferably from 0.8 to 2.2 mm. If the hydraulic diameter of each of the plurality of cells 2 is smaller than 0.5 mm, it is not desirable that this may cause the initial pressure loss to increase. If the hydraulic diameter of each of the plurality of cells 2 is larger than 2.5 mm, it is not desirable that this may cause a contact area of an exhaust gas with the partition wall 1 to decrease, and the purification efficiency may deteriorate. Herein, the hydraulic diameter of each of the plurality of cells 2 refers to a value calculated by "4×(cross-sectional area)/(circumferential length)" based on the cross-sectional area and the circumferential length of each cell 2. The cross-sectional area of the cell 2 refers to the area of the shape of cell (cross-sectional shape) appearing in a cross section perpendicular to the center axial direction of the plugged honeycomb structure, and the circumferential length of the cell refers to the length of the circumference of the cross-sectional shape of the cell (length of a closed line surrounding the cross section).

Considering the trade-off among the initial pressure loss, the pressure loss during a PM accumulation and the trapping efficiency, the plugged honeycomb structure of the present embodiment preferably satisfies the following configurations at the same time. That is, a geometrical surface area GSA of the inflow cells 2$y$ is from 10 to 30 $cm^2/cm^3$, a cell open frontal area of the inflow cells 2$y$ is from 20 to 70%, and a hydraulic diameter of each of the plurality of cells 2 is from 0.5 to 2.5 mm, which are preferably satisfied at the same time. Furthermore, the followings are more preferably satisfied at the same time, i.e., a geometrical surface area GSA of the inflow cells 2$y$ is from 12 to 18 $cm^2/cm^3$, a cell open frontal area of the inflow cells 2$y$ is from 25 to 65%, and a hydraulic diameter of each of the plurality of cells 2 is from 0.8 to 2.2 min.

In the plugged honeycomb structure of the present embodiment, a catalyst may be loaded onto the partition wall 1 defining the plurality of cells 2. Loading a catalyst onto the partition wall 1 means that the surface of the partition wall 1 and the inner wall of pores formed at the partition wall 1 are coated with the catalyst. Examples of the kinds of catalyst include an SCR catalyst (zeolite, titania, vanadium), at least two kinds of noble metals of Pt, Rh, and Pd, and three-way catalyst containing at least one kind of alumina, ceria, and zirconia. Loading such a catalyst onto the partition wall enables a detoxication of NOx, CO, HC and the like contained in an exhaust gas emitted from a direct injection type gasoline engine and a diesel engine, for example, and facilitates a combustion of the PM accumulated at the surface of the partition wall 1 for removal due to the catalyst action.

The method for loading of such catalyst in the plugged honeycomb structure of the present embodiment is not limited especially, and a method typically performed by a person skilled in the art can be used. Specifically, the method for loading of a catalyst includes a method that a catalyst slurry may be wash-coated, be dried and fired, for example.

Figure 10:
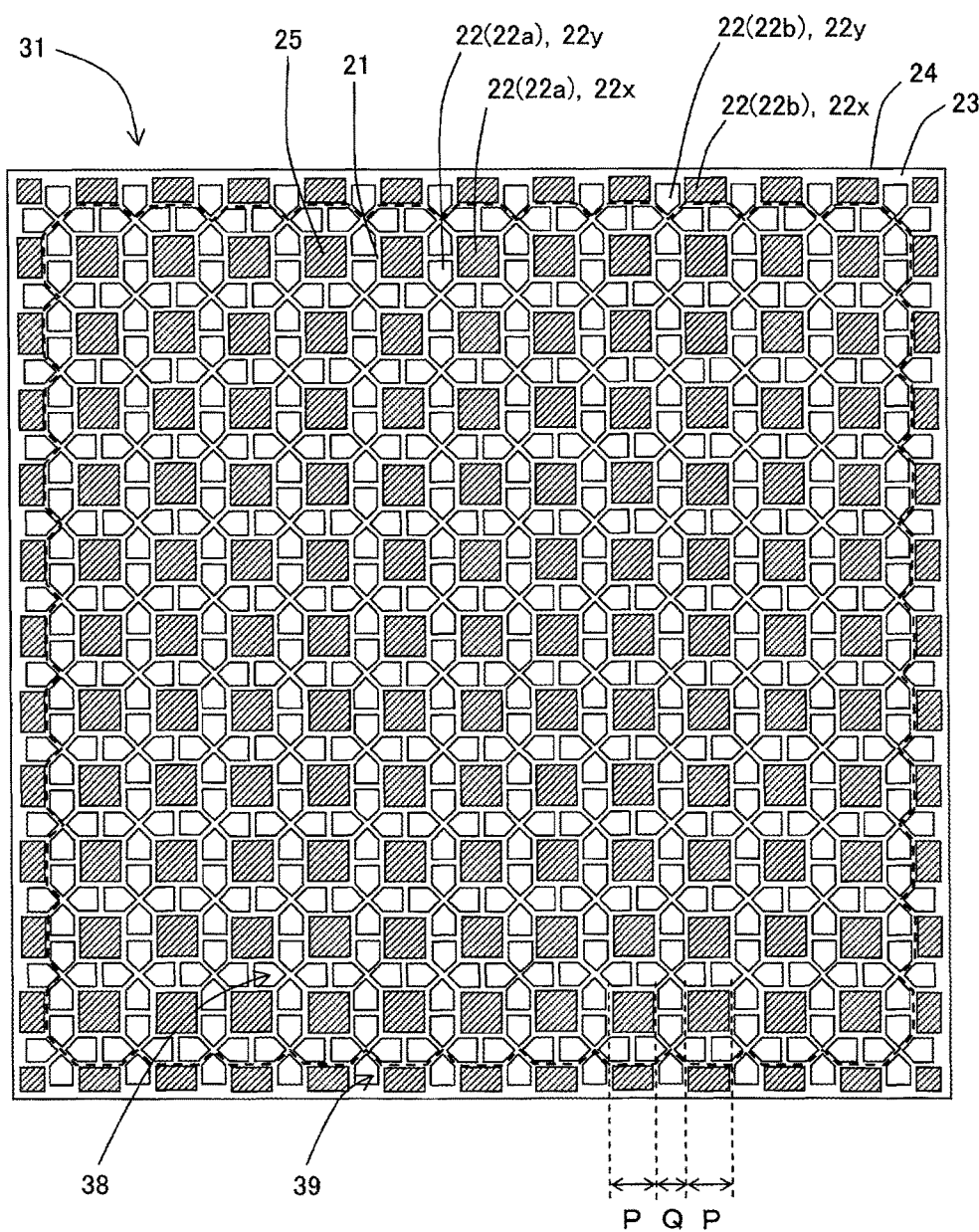
FIG. 10 is a schematic plan view showing a plugged honeycomb segment included in the second embodiment of a plugged honeycomb structure according to the present invention when viewed from the inflow-side end face.
Figure 11:
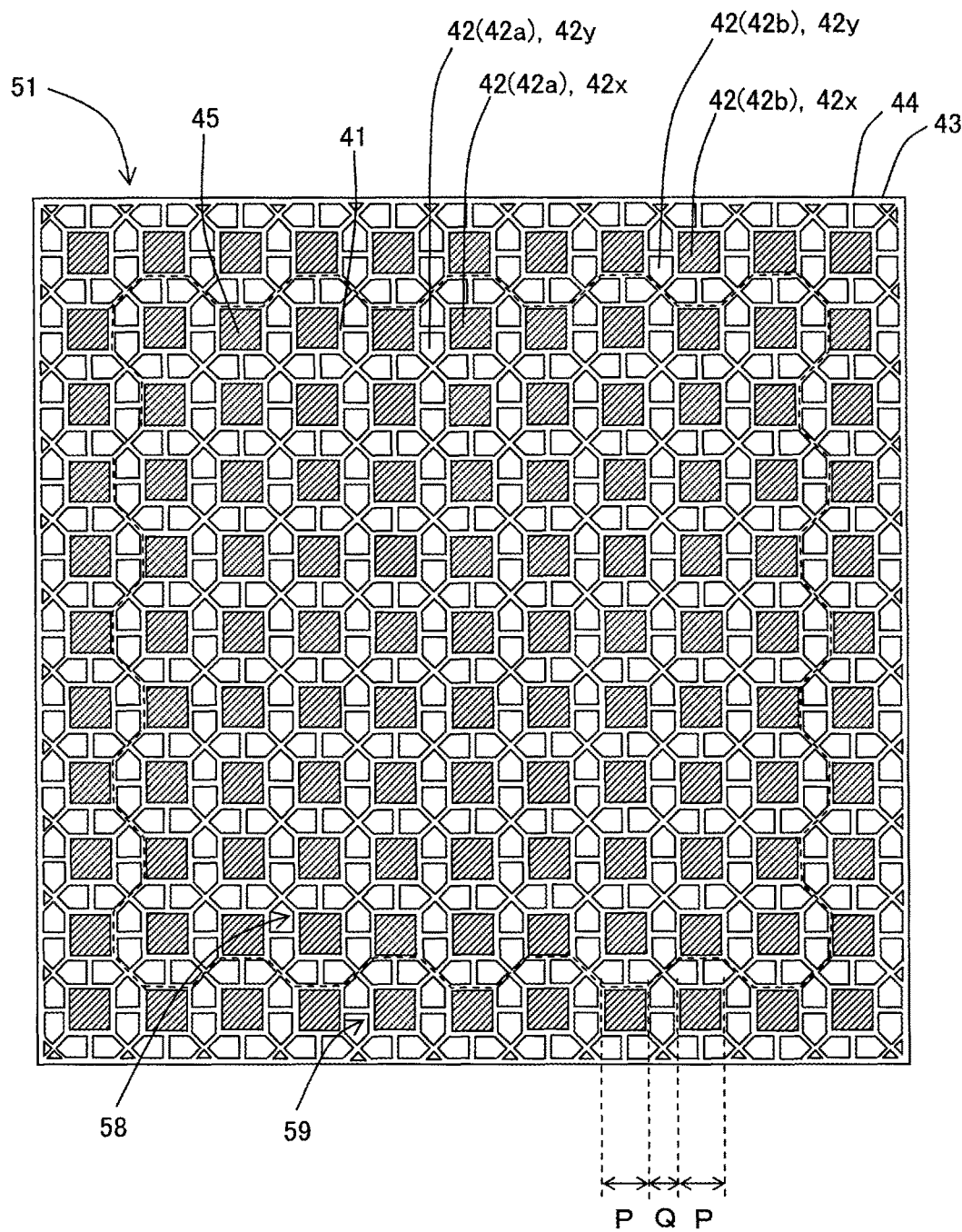
FIG. 11 is a schematic plan view showing a plugged honeycomb segment included in the third embodiment of a plugged honeycomb structure according to the present invention when viewed from the inflow-side end face.
Figure 12:
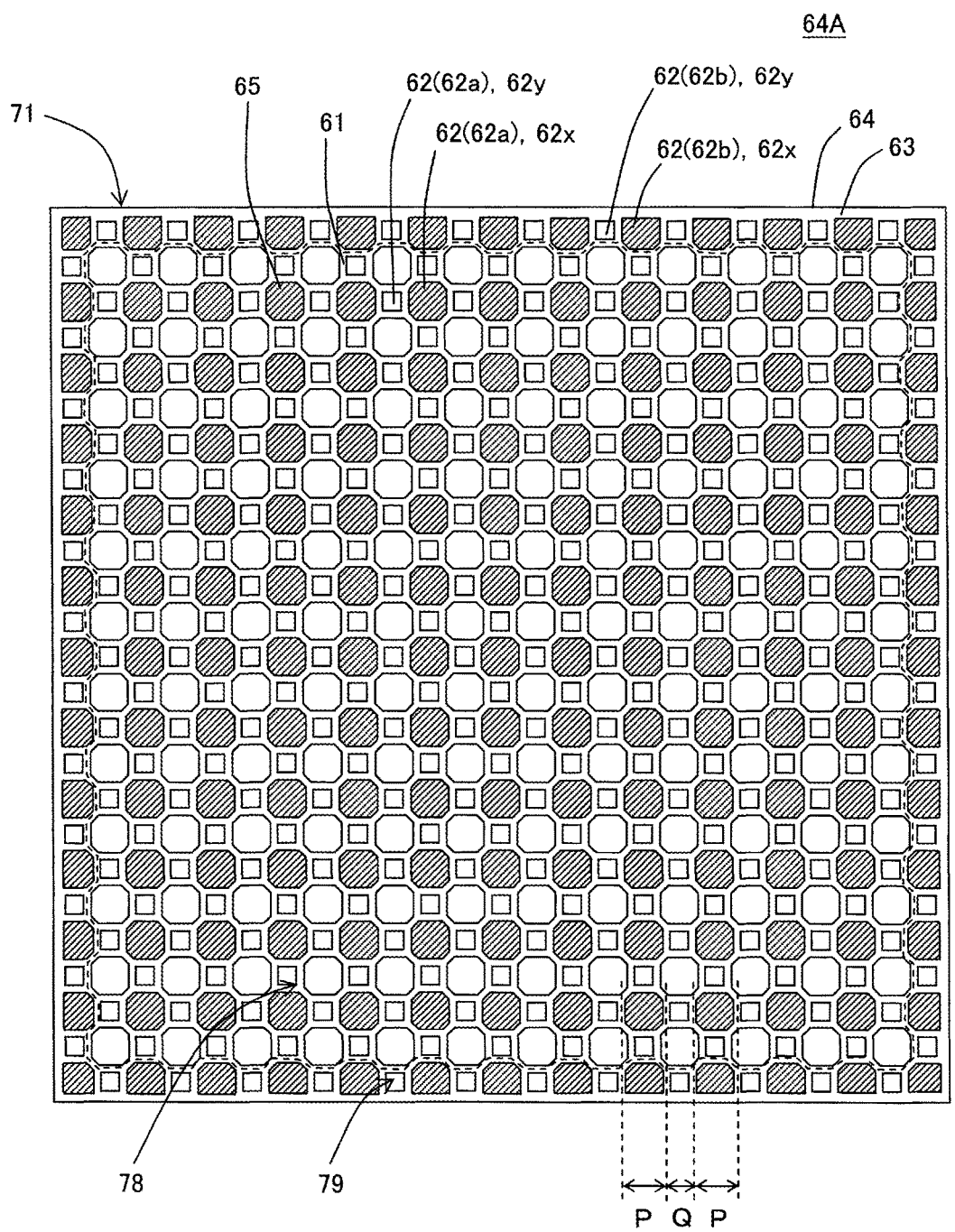
FIG. 12 is a schematic plan view showing a plugged honeycomb segment included in the fourth embodiment of a plugged honeycomb structure according to the present invention when viewed from the inflow-side end face.
Figure 13:
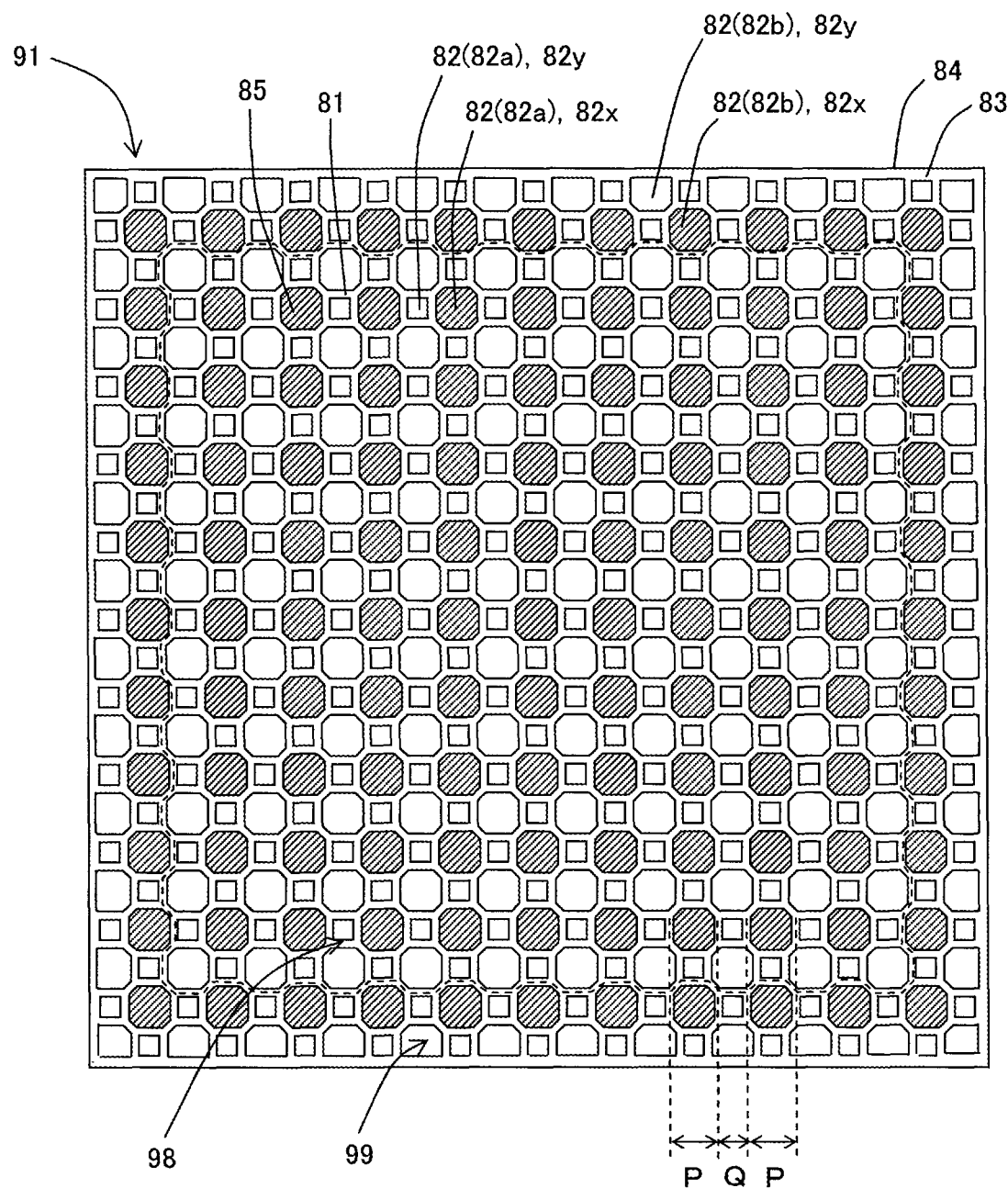
FIG. 13 is a schematic plan view showing a plugged honeycomb segment included in the fifth embodiment of a plugged honeycomb structure according to the present invention when viewed from the inflow-side end face.
Figure 14:
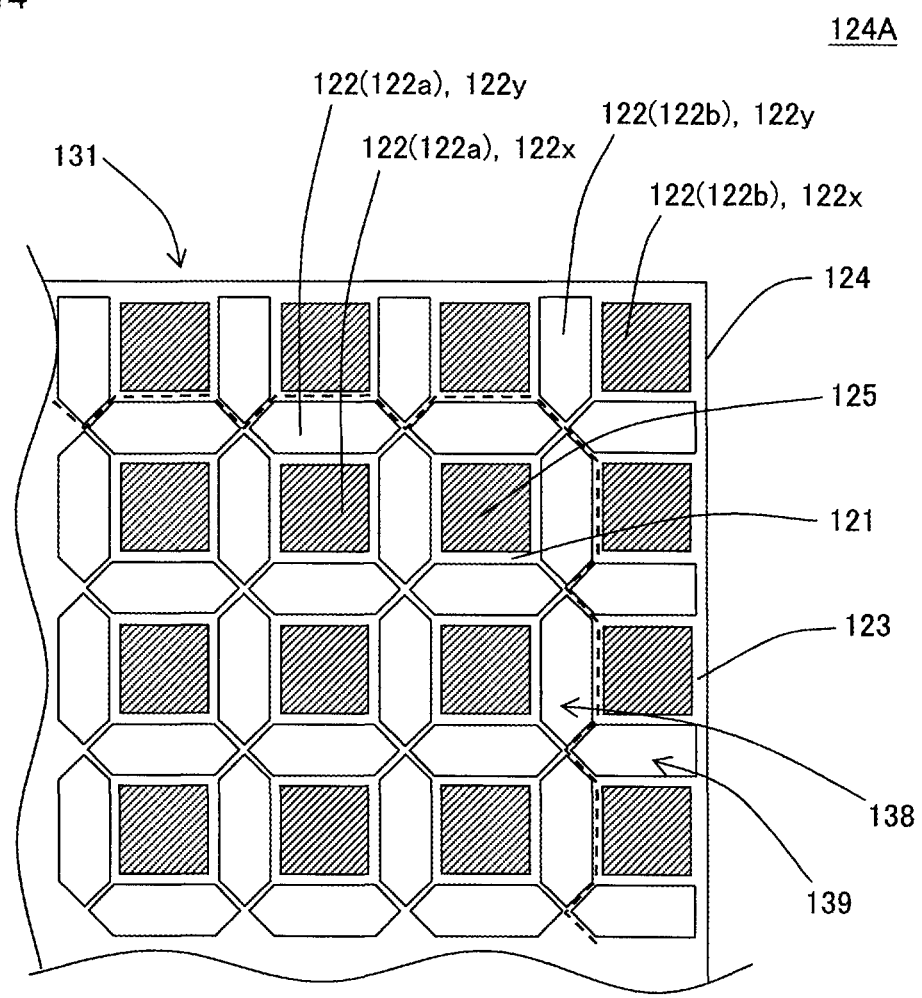
FIG. 14 is a schematic partially enlarged plan view showing a plugged honeycomb segment included in the sixth embodiment of a plugged honeycomb structure according to the present invention when viewed from the inflow-side end face.

The following describes other embodiments (the second embodiment to the sixth embodiment) of the plugged honeycomb structure of the present invention. The plugged honeycomb structures of the second embodiment to the sixth embodiment are preferably configured similarly to the first embodiment other than that the plugged honeycomb segments thereof are different from the plugged honeycomb segments included in the plugged honeycomb structure of the first embodiment. FIG. 10 is a schematic plan view showing the plugged honeycomb segment included in the plugged honeycomb structure that is the second embodiment of the present invention when viewed from the inflow-side end face. FIG. 11 is a schematic plan view showing the plugged honeycomb segment included in the plugged honeycomb structure that is the third embodiment of the present invention when viewed from the inflow-side end face. FIG. 12 is a schematic plan view showing the plugged honeycomb segment included in the plugged honeycomb structure that is the fourth embodiment of the present invention when viewed from the inflow-side end face. FIG. 13 is a schematic plan view showing the plugged honeycomb segment included in the plugged honeycomb structure that is the fifth embodiment of the present invention when viewed from the inflow-side end face. FIG. 14 is a schematic plan view showing the plugged honeycomb segment included in the plugged honeycomb structure that is the sixth embodiment of the present invention when viewed from the inflow-side end face.

The plugged honeycomb structure of the second embodiment includes a plugged honeycomb segment 24A as shown in FIG. 10. The honeycomb segment 24 includes a porous partition wall 21 that defines a plurality of cells 22, and a segment circumferential wall 23 disposed at the outermost circumference. Plugging portions 25 are disposed in the open ends of outflow cells 22x and in open ends of inflow cells 22y of the honeycomb segment 24. In FIG. 10, a reference numeral 22a denotes a center region cell, and a reference numeral 22b denotes a circumferential region cell.

The honeycomb segment 24 has a center region 38 including a center of the cross section orthogonal to the extension direction of the cells 22 and a circumferential region 39 located in the side of the circumference of the center region 38. In FIG. 10, the inside region surrounded by the dotted line is the center region 38 of the honeycomb segment 24, and the outer region outside of the region surrounded by the dotted line is the circumferential region 39 of the honeycomb segment 24. The center region 38 is a region having a cell arrangement pattern such that inflow cells 22y surround one outflow cell 22x. In the honeycomb segment 24 shown in FIG. 10, the plugging portions 25 are disposed so that inflow cells 22y that the shape of the cells 22 is a pentagonal shape surround one outflow cell 22x that the shape of the cell 22 is a quadrangular shape. In the inflow end face 31 of the honeycomb segment 24, the circumferential region 39 is configured to have an open frontal area that is smaller than an open frontal area of the center region 38.

The plugged honeycomb segment 24A is configured so that a thickness of the segment circumferential wall 23 of the honeycomb segments 24 is from 0.3 to 1.0 mm. Then, in the plugged honeycomb structure including this plugged honeycomb segment 24A, a thickness of the bonding layer 6 is from 0.5 to 1.5 mm.

The plugged honeycomb structure of the third embodiment includes a plugged honeycomb segment 44A as shown in FIG. 11. The honeycomb segment 44 includes a porous partition wall 41 that defines a plurality of cells 42, and a segment circumferential wall 43 disposed at the outermost circumference. Plugging portions 45 are disposed in the open ends of outflow cells 42x and in the open ends of inflow cells 42y of the honeycomb segment 44. In FIG. 11, a reference numeral 42a denotes a center region cell, and a reference numeral 42b denotes a circumferential region cell.

The honeycomb segment 44 has a center region 58 including a center of the cross section orthogonal to the extension direction of the cells 42 and a circumferential region 59 located in the side of the circumference of the center region 58. In FIG. 11, the inside region surrounded by the dotted line is the center region 58 of the honeycomb segment 44, and the outer region outside of the region surrounded by the dotted line is the circumferential region 59 of the honeycomb segment 44. The center region 58 is a region having a cell arrangement pattern such that inflow cells 42y surround one outflow cell 42x. In the honeycomb segment 44 shown in FIG. 11, the plugging portions 45 are disposed so that inflow cells 42y that a shape of the cells 42 is a pentagonal shape surround one outflow cell 42x that a shape of the cell 42 is a quadrangular shape. That is, the plugged honeycomb segment 44A shown in FIG. 11 has a "repeated arrangement pattern" including the outflow cells 42x whose cross-sectional shape is a quadrangular shape and the inflow cells 42y whose cross-sectional shape is a pentagonal shape.

In the plugged honeycomb segment 44A shown in FIG. 11 as well, in the inflow end face 51 of the honeycomb segment 44, the circumferential region 59 is configured to have an open frontal area that is smaller than an open frontal area of the center region 58.

The plugged honeycomb structure of the fourth embodiment includes a plugged honeycomb segment 64A as shown in FIG. 12. The honeycomb segment 64 includes a porous partition wall 61 that defines a plurality of cells 62, and a segment circumferential wall 63 disposed at the outermost circumference. Plugging portions 65 are disposed in the open ends of outflow cells 62x and in the open ends of inflow cells 62y of the honeycomb segment 64. In FIG. 12, a reference numeral 62a denotes a center region cell, and a reference numeral 62b denotes a circumferential region cell.

The honeycomb segment 64 has a center region 78 including a center of the cross section orthogonal to the extension direction of the cells 62 and a circumferential region 79 located in the side of the circumference of the center region 78. In FIG. 12, the inside region surrounded by the dotted line is the center region 78 of the honeycomb segment 64, and the outer region outside of the region surrounded by the dotted line is the circumferential region 79 of the honeycomb segment 64. The center region 78 is a region having a cell arrangement pattern such that inflow cells 62y surround one outflow cell 62x. The plugged honeycomb segment 64A shown in FIG. 12 has a "repeated arrangement pattern" including the outflow cells 62x whose cross-sectional shape is an octagonal shape and the inflow cells 62y whose cross-sectional shape is a quadrangular shape and an octagonal shape.

In the plugged honeycomb segment 64A shown in FIG. 12 as well, in the inflow end face 71 of the honeycomb segment 64, the circumferential region 79 is configured to have an open frontal area that is smaller than an open frontal area of the center region 78.

The plugged honeycomb structure of the fifth embodiment includes a plugged honeycomb segment 84A as shown in FIG. 13. The honeycomb segment 84 includes a porous partition wall 81 that defines a plurality of cells 82, and a segment circumferential wall 83 disposed at the outermost circumference. Plugging portions 85 are disposed in the open ends of outflow cells 82x and in the open ends of inflow cells 82y of the honeycomb segment 84. In FIG. 13, reference numeral 82a denotes a center region cell, and reference numeral 82b denotes a circumferential region cell.

The honeycomb segment 84 has a center region 98 including a center of the cross section orthogonal to the extension direction of the cells 82 and a circumferential region 99 located in the side of the circumference of the center region 98. In FIG. 13, the inside region surrounded by the dotted line is the center region 98 of the honeycomb segment 84, and the outer region outside of the region surrounded by the dotted line is the circumferential region 99 of the honeycomb segment 84. The center region 98 is a region having a cell arrangement pattern such that inflow cells 82y surround one outflow cell 82x. Moreover, the plugged honeycomb segment 84A shown in FIG. 11 has a "repeated arrangement pattern" including the outflow cells 82x whose cross-sectional shape is an octagonal shape and the inflow cells 82y whose cross-sectional shapes are a quadrangular shape and an octagonal shape.

In the plugged honeycomb segment 84A shown in FIG. 13 as well, in the inflow end face 91 of the honeycomb segment 84, the circumferential region 99 is configured to have an open frontal area that is smaller than an open frontal area of the center region 98.

The plugged honeycomb structure of the sixth embodiment includes a plugged honeycomb segment 124A as shown in FIG. 14. The honeycomb segment 124 includes porous partition walls 121 that define a plurality of cells 122, and a segment circumferential wall 123 disposed at the outermost circumference. Plugging portions 125 are disposed in the open ends of outflow cells 122x and in the open ends of inflow cells 122y of the honeycomb segment 124. In FIG. 14, a reference numeral 122a denotes a center region cell, and a reference numeral 122b denotes a circumferential region cell.

The honeycomb segment 124 has a center region 138 including a center of the cross section orthogonal to the extension direction of the cells 122 and a circumferential region 139 located in the side of the circumference of the center region 138. In FIG. 14, the inside region surrounded by the dotted line is the center region 138 of the honeycomb segment 124, and the outer region outside of the region surrounded by the dotted line is the circumferential region 139 of the honeycomb segment 124. The center region 138 is a region having a cell arrangement pattern such that inflow cells 122y surround one outflow cell 122x. In the honeycomb segment 124 shown in FIG. 14, the plugging portions 125 are disposed so that inflow cells 122y that a shape of the cells 122 is a hexagonal shape surround one outflow cell 122x that a shape of the cell 122 is a quadrangular shape. That is, the plugged honeycomb segment 124A shown in FIG. 14 has a "repeated arrangement pattern" including the outflow cells 122x whose cross-sectional shape is a quadrangular shape and the inflow cells 122y whose cross-sectional shape is a hexagonal shape.

In the plugged honeycomb segment 124A shown in FIG. 14 as well, in the inflow end face 131 of the honeycomb segment 124, the circumferential region 139 is configured to have an open frontal area that is smaller than an open frontal area of the center region 138.

Furthermore, the plugged honeycomb segments in the first to the sixth embodiments are configured so that the overall cell arrangement defined by the partition walls is axisymmetric in a cross section orthogonal to the axial direction of the plugged honeycomb segment. Although not illustrated, the plugged honeycomb segment may be configured so that the overall arrangement of the cells defined by the partition walls is not axisymmetric in a cross section orthogonal to the axial direction of the plugged honeycomb segment. In such a plugged honeycomb segment as well, it is configured so that the circumferential region is configured to have an open frontal area that is smaller than an open frontal area of the center region in the inflow end face of the honeycomb segment, whereby advantageous effects in the same as those of the plugged honeycomb structure of the first embodiment can be obtained.

(2) Method for Manufacturing Plugged Honeycomb Structure:

There is no particular limitation on the method for manufacturing the plugged honeycomb structure of the present embodiment shown in FIGS. 1 through 5, and this can be manufactured by the following method, for example. Firstly a kneaded material having plasticity is prepared to manufacture a honeycomb segment. The kneaded material to manufacture a honeycomb segment can be prepared by appropriately adding additives such as a binder and water into a material selected as a raw material powder from the aforementioned materials suitable for honeycomb segment. As the raw material powder, for example, silicon carbide powder may be used. For example, the binder includes methyl cellulose or hydroxypropoxylmethylcellulose. Moreover, the additives include a surfactant.

Next, the thus obtained kneaded material is extruded to prepare a prismatic columnar honeycomb formed body, having partition walls defining a plurality of cells and a segment circumferential wall disposed at the outermost circumference. A plurality of the honeycomb formed bodies is prepared.

The thus obtained honeycomb formed bodies are dried by microwaves and hot air, for example, and then open ends of the cells are plugged with the same material as the material used for the honeycomb formed bodies to prepare plugging portions. After the plugging portions are prepared, the honeycomb formed bodies may be further dried.

Next, each of the honeycomb formed bodies with the plugging portions are fired to obtain a plugged honeycomb segment. The firing temperature and the atmosphere for firing depend on the raw materials used, and a person skilled in the art could select an appropriate temperature and atmosphere for firing depending on the selected materials. Next, the pluralities of plugged honeycomb segments are mutually bonded by using a bonding material. After the plurality of plugged honeycomb segments are dried and hardened, a circumference is processed to obtain a desirable shape, and then this can provide a plugged honeycomb structure having a segmented structure. The bonding material may include a material prepared by adding a solvent such as water into a ceramics material to be in a paste form. Since the cells are exposed in the processed surface after the circumference of the plugged honeycomb segments is processed, a circumference coating material may be applied to the processed surface to form the outer wall 8 as shown in FIG. 1. As the circumference coating material, the same material as that of the bonding material can be used.

(3) Plugged Honeycomb Segment:

Next, the following describes the first embodiment of the plugged honeycomb segment of the present invention. The plugged honeycomb segment of the present embodiment is used for the plugged honeycomb structure of the first embodiment as described above.

The plugged honeycomb segment of the present embodiment includes a honeycomb segment 4 and plugging portions 5 as shown in FIGS. 6 through 8. The honeycomb segment 4 includes a porous partition wall 1 that defines a plurality of cells 2 extending from an inflow end face 11 to which a fluid flows to an outflow end face 12 from which a fluid flows, and a segment circumferential wall 3 disposed at the outermost circumference. The plugging portions 5 are disposed in the open ends of the cells 2 formed in each of the honeycomb segments 4, and they plug either one of the open end on the side of the inflow end face 11 and on the side of the outflow end face 12. In the plugged honeycomb segment 4A of the present embodiment, a thickness of the segment circumferential wall 3 of the honeycomb segment 4 is from 0.3 to 1.0 mm.

The honeycomb segment 4 has a center region 18 including a center of the cross section orthogonal to the extension direction of the cells 2 and a circumferential region 19 located in the side of the circumference of the center region 18. In FIGS. 7 and 8, the inside region surrounded by the dotted line is the center region 18 of the honeycomb segment 4, and the outer region outside of the region surrounded by the dotted line is the circumferential region 19 of the honeycomb segment 4. The center region 18 is a region having a cell arrangement pattern such that inflow cells 2y surround one outflow cell 2x. Then the circumferential region 19 is outside the center region 18, which does not have a cell arrangement pattern in the center region 18 as described above.

The plugged honeycomb segment 4A of the present embodiment is configured so that in the inflow end face 11 of the honeycomb segment 4 the circumferential region 19 has an open frontal area that is smaller than an open frontal area of the center region 18. The thus configured plugged honeycomb segment of the present embodiment can be preferably used as a honeycomb segment to prepare the plugged honeycomb structure of the first embodiment.

A suitable example of the plugged honeycomb segment of the present embodiment includes a plugged honeycomb segment used for the plugged honeycomb structure of the first embodiment.

Other suitable examples of the plugged honeycomb segment of the present invention include plugged honeycomb segments used for the plugged honeycomb structures according to the second to the sixth embodiments shown in FIGS. 10 through 13.

EXAMPLES

Example 1

As a ceramic raw material, silicon carbide (SiC) powder and metal silicon (Si) powder were mixed at the mass ratio of 80:20 to prepare a mixed raw material. Hydroxypropylmethylcellulose as a binder, a water absorbable resin as a pore former and further water were added to this mixed raw material to prepare a forming raw material. Then, the obtained forming raw material was kneaded by a kneader to prepare a kneaded material.

Next, the obtained kneaded material was formed by a vacuum extruder to prepare sixteen pieces of quadrangular prismatic-columnar honeycomb segments having the same repeated arrangement pattern as that of the plugged honeycomb segment 4A shown in FIG. 7. Herein, the "the same repeated arrangement pattern as that of the plugged honeycomb segment 4A shown in FIG. 7" means a repeated arrangement pattern such that eight inflow cells whose cross-sectional shape is a pentagonal shape surround an outflow cell whose cross-sectional shape is a square shape.

Next, the obtained honeycomb segments were dried by high-frequency induction heating and then dried at 120° C. for 2 hours by a hot-air dryer. The drying was performed so that the outflow end faces of the honeycomb segments were in a vertically downward direction.

Plugging portions were formed in each of the dried honeycomb segments. Firstly, the inflow end face of the honeycomb segment was masked, and next the masked end (end on the side of the inflow end face) was immersed in a plugging slurry, and the plugging slurry was charged into open ends of the cells which were not masked (outflow cells). In this way, plugging portions were formed on the side of the inflow end face of the honeycomb segment. Then, plugging portions were formed on the side of the outflow end face at the inflow cells of the dried honeycomb segment in the same manner as on the side of the inflow end face of the honeycomb segment.

Then the honeycomb segment including the plugging portions was degreased and fired to obtain a plugged honeycomb segment. The degreasing was performed at 550° C. for 3 hours, and the firing was performed at 1,450° C. in an argon atmosphere for 2 hours. The firing was performed so that the outflow end faces of the honeycomb segments including plugging portions were in a vertically downward direction.

The prepared plugged honeycomb segment had quadrangular outflow cells 2x and quadrangular inflow cells 2y at the outermost circumference in the same as the plugged honeycomb segment 4A shown in FIG. 7. Herein, the quadrangular inflow cells 2y formed at the outermost circumference included a part of the shape of pentagonal inflow cells 2y. In the plugged honeycomb segment prepared in Example 1, the quadrangular outflow cells 2x and the quadrangular inflow cells 2y formed at the outermost circumference as well as the pentagonal inflow cells 2y formed on the outermost circumferential side formed the circumferential region 19. Then, the center region 18 was inside the circumferential region 19. The design of the plugged honeycomb segment in which the inflow cells and the outflow cells are configured as described above is called "design A". In the column of "design" of in table 1, the design of the plugged honeycomb segment used in Example 1 is shown.

In the prepared plugged honeycomb segment, a cross sectional shape orthogonal to the axial direction was square, and the length of one side of the square (segment size) was 39.7 mm. Furthermore, in the honeycomb segment, the length in the axial direction was 152.4 mm. Then in the plugged honeycomb segment, the distance P shown in FIG. 7 was 2.0 mm, the distance Q was 1.2 mm, and the thickness of the partition wall was 0.32 mm. Table 1 shows the values of "segment size (one side) [mm]", "thickness of partition wall [mm]", "distance P [mm]", and "distance Q [mm]".

In the prepared plugged honeycomb segment, the open frontal area of the center region in the inflow end face was 35%. In the prepared plugged honeycomb segment, the open frontal area of the circumferential region in the inflow end face was 22%. The value obtained by subtracting the value of the open frontal area in the circumferential region from the value of the open frontal area in the center region in the inflow end face was 13%. Table 1 shows the values of "open frontal area of center region in inflow end face", "open frontal area of circumferential region in inflow end face" and "difference of open-frontal area". Herein the "difference of open-frontal area" refers to a value obtained by subtracting the value of the open frontal area in the circumferential region from the value of the open frontal area in the center region in the inflow end face. In the prepared plugged honeycomb segment, a thickness of the segment circumferential wall was 0.5 mm. In the column of "segment circumferential wall thickness [mm]" in Table 1, the thickness of the segment circumferential wall is shown.

The sixteen pieces of plugged honeycomb segments were fired and integrally bonded with a bonding material (ceramic cement). The bonding material contained inorganic particles and an inorganic adhesive as main components and an organic binder, a surfactant, a foamable resin, water and the like as subcomponents. Plate-like particles were used as the inorganic particles, and a colloidal silica (silica sol) was used as the inorganic adhesive. Mica was used as the plate-like particles. The circumference of the honeycomb-segment bonded member including the sixteen pieces of honeycomb segments integrally bonded was ground to be a round pillar shape, and a coating material was applied to the circumferential face thereof to obtain the plugged honeycomb structure of Example 1. The diameter at the end face of the plugged honeycomb structure of Example 1 was 143.8 mm. The coating material contained a ceramic powder, water and a bonding material. The width of the bonding layer formed with the bonding material was 1 mm. In the column of "bonding width [mm]" in Table 1, the width of the bonding layer is shown.

region 59. The design of the plugged honeycomb segment in which the inflow cells and the outflow cells are configured as described above is called "design B". In the column of

TABLE 1

| | Design | Segment size (one side) [mm] | Thickness of partition wall [mm] | Distance P [mm] | Distance Q [mm] | Open frontal area of center region in inflow end face | Open frontal area of circumferential region in inflow end face | Difference of open-frontal area | Bonding width [mm] | Thickness of segment circumferential wall [mm] | Limit of PM accumulation | Pressure loss |
|---|---|---|---|---|---|---|---|---|---|---|---|---|
| Comp. Ex. 1 | B | 37 | 0.32 | 2.0 | 1.2 | 36% | 36% | 0% | 1 | 0.5 | — | — |
| Ex. 1 | A | 39.7 | 0.32 | 2.0 | 1.2 | 35% | 22% | 13% | 1 | 0.5 | A | C |
| Ex. 2 | A | 41.1 | 0.32 | 2.0 | 1.2 | 35% | 24% | 11% | 1 | 0.5 | A | C |
| Ex. 3 | B | 36.8 | 0.32 | 2.0 | 1.2 | 35% | 34% | 1% | 1 | 0.5 | C | B |
| Comp. Ex. 2 | B | 37.2 | 0.32 | 2.0 | 1.2 | 36% | 38% | −2% | 1 | 0.5 | D | B |
| Ex. 4 | A | 39.7 | 0.32 | 2.0 | 1.2 | 35% | 22% | 13% | 1.5 | 0.5 | A | C |
| Comp. Ex. 3 | A | 39.7 | 0.32 | 2.0 | 1.2 | 35% | 22% | 13% | 1.6 | 0.5 | A | D |
| Ex. 5 | A | 39.7 | 0.32 | 2.0 | 1.2 | 35% | 22% | 13% | 0.5 | 0.5 | C | B |
| Comp. Ex. 4 | A | 39.7 | 0.32 | 2.0 | 1.2 | 35% | 22% | 13% | 0.4 | 0.5 | D | B |
| Ex. 6 | A | 40.7 | 0.32 | 2.0 | 1.2 | 35% | 22% | 13% | 1 | 1 | C | C |
| Comp. Ex. 5 | A | 40.9 | 0.32 | 2.0 | 1.2 | 35% | 22% | 13% | 1 | 1.1 | D | D |
| Ex. 7 | A | 39.3 | 0.32 | 2.0 | 1.2 | 35% | 22% | 13% | 1 | 0.3 | C | B |
| Comp. Ex. 6 | A | 39.1 | 0.32 | 2.0 | 1.2 | 35% | 22% | 13% | 1 | 0.2 | D | A |
| Ex. 8 | B | 36.8 | 0.32 | 2.0 | 1.2 | 35% | 34% | 1% | 1.5 | 0.5 | B | C |
| Comp. Ex. 7 | B | 36.8 | 0.32 | 2.0 | 1.2 | 35% | 34% | 1% | 1.6 | 0.5 | B | D |
| Ex. 9 | B | 36.8 | 0.32 | 2.0 | 1.2 | 35% | 34% | 1% | 0.5 | 0.5 | C | A |
| Comp. Ex. 8 | B | 36.8 | 0.32 | 2.0 | 1.2 | 35% | 34% | 1% | 0.4 | 0.5 | D | A |
| Ex. 10 | B | 37.8 | 0.32 | 2.0 | 1.2 | 35% | 34% | 1% | 1 | 1 | C | C |
| Comp. Ex. 9 | B | 38 | 0.32 | 2.0 | 1.2 | 35% | 34% | 1% | 1 | 1.1 | D | D |
| Ex. 11 | B | 36.4 | 0.32 | 2.0 | 1.2 | 35% | 34% | 1% | 1 | 0.3 | C | B |
| Comp. Ex. 10 | B | 36.2 | 0.32 | 2.0 | 1.2 | 35% | 34% | 1% | 1 | 0.2 | D | A |
| Comp. Ex. 11 | D | 35.9 | 0.31 | 1.7 | 1.4 | 46% | 46% | 0% | 1 | 0.5 | D | B |
| Ex. 12 | C | 39.3 | 0.31 | 1.7 | 1.4 | 46% | 29% | 17% | 1 | 0.5 | A | C |
| Ex. 13 | D | 34.7 | 0.31 | 1.7 | 1.4 | 46% | 36% | 10% | 1 | 0.5 | A | C |
| Ex. 14 | D | 35.8 | 0.31 | 1.7 | 1.4 | 46% | 45% | 1% | 1 | 0.5 | C | B |

Examples 2 to 14

The plugged honeycomb structures of Examples 2 to 14 were manufactured, in which the design, segment size, thickness of a partition wall, distance P, distance Q, open frontal area of a center region in an inflow end face, open frontal area of a circumferential region in an inflow end face, bonding width, and segment circumferential wall thickness were changed as shown in Table 1. The ceramic raw material to prepare the plugged honeycomb segments was prepared in the same manner as in Example 1.

In Example 3, sixteen pieces of quadrangular prismatic-columnar honeycomb segments having the same repeated arrangement pattern as the plugged honeycomb segment 44A shown in FIG. 11 were prepared. The prepared plugged honeycomb segment had the circumferential region 59 in the same manner as in the plugged honeycomb segment 44A shown in FIG. 11. That is, the triangular inflow cells 42y formed at the outermost circumference as well as the quadrangular outflow cells 42x formed on the outermost circumferential side and the pentagonal inflow cells 42y surrounding the outflow cells 42x formed the circumferential region 59. Then, the center region 58 was inside the circumferential region 59. The design of the plugged honeycomb segment in which the inflow cells and the outflow cells are configured as described above is called "design B". In the column of "design" in Table 1, the design of the plugged honeycomb segment used in Example 3 is shown.

In Example 12, sixteen pieces of quadrangular prismatic-columnar honeycomb segments having the same repeated arrangement pattern as the plugged honeycomb segment 64A shown in FIG. 12 were prepared. The prepared plugged honeycomb segment had the circumferential region 79 formed by the inflow cells 62y and the outflow cells 62x formed at the outermost circumference in the same manner as in the plugged honeycomb segment 64A shown in FIG. 12. Then, the center region 78 was inside the circumferential region 79. The design of the plugged honeycomb segment in which the inflow cells and the outflow cells are configured as described above is called "design C". In the column of "design" in Table 1, the design of the plugged honeycomb segment used in Example 12 is shown.

In Example 13, sixteen pieces of quadrangular prismatic-columnar honeycomb segments having the same repeated arrangement pattern as the plugged honeycomb segment 84A shown in FIG. 13 were prepared. The prepared plugged honeycomb segment had the circumferential region 99 formed by the inflow cells 82y formed at the outermost circumference as well as the inflow cells 82y and the outflow cells 82x formed inwardly by one of the inflow cells 82y formed at the outermost circumference in the same manner as in the plugged honeycomb segment 84A shown in FIG. 13. Then, the region inside the circumferential region 99 was the center region 98. The design of the plugged honeycomb segment in which the inflow cells and the outflow cells are configured as described above is called "design D". In the column of "design" in Table 1, the plugged honeycomb segment used in Example 13 is shown.

Comparative Examples 1 to 11

The plugged honeycomb structures of Comparative Examples 1 to 11 were manufactured, in which the design, segment size, thickness of a partition wall, distance P, distance Q, open frontal area of a center region at an inflow end face, open frontal area of a circumferential region at an inflow end face, bonding width, and segment circumferential wall thickness were changed as shown in Table 1. The ceramic raw material to prepare the plugged honeycomb segments was prepared in the same manner as in Example 1.

As to the plugged honeycomb structures of Examples 1 to 14 and Comparative Examples 1 to 11, evaluations of a PM accumulation limit (crack limit) and pressure loss were carried out by methods described below. Table 1 shows the results of the evaluations.

(PM Accumulation Limit (Crack Limit))

The plugged honeycomb structures of Examples 1 to 14 and Comparative Examples 1 to 11 were mounted on an exhaust system of a diesel engine of a displacement of 2.0 L, and a soot was accumulated to these filters. Next, the temperature of exhaust gas was raised to 650° C. at 3° C./sec. Then, the operation condition was changed to idling, so as to reduce the flow rate of gas rapidly. Under such a condition, the filters were regenerated. This test (filter regeneration) was repeatedly performed while gradually raising the accumulation rate of a soot in the filters. Then the maximum accumulation rate of a soot before cracks were generated at the filters was examined. The accumulation rate of a soot at this time was set to "crack limit".

Evaluation A: the ratio to Comparative Example 1 as a reference was +1.5 g/L or more.

Evaluation B: the ratio to Comparative Example 1 as a reference was +1.0 g/L or more.

Evaluation C: the ratio to Comparative Example 1 as a reference was +0.5 g/L or more.

Evaluation D: the ratio to Comparative Example 1 as a reference was less than +0.5 g/L.

(Pressure Loss)

Firstly, the plugged honeycomb structure of Comparative Example 1 was attached to an exhaust system of an automobile which a diesel engine for automobile of a displacement of 2.0 L was mounted. Using this automobile, the pressure loss during full-load step-up was measured in the vehicle testing by a chassis dynamometer. Specifically, the engine revolutions were raised by 1,000 rpm for every 3 minutes/step to 5,000 rpm, and the pressure loss at each step was measured. The pressure loss of the plugged honeycomb structure of Comparative Example 1 was set as the reference for pressure loss evaluation. Next, the pressure loss of the plugged honeycomb structures of Examples 1 to 14 and Comparative Examples 2 to 11 was measured by a method in the same manner as in Comparative Example 1. The values of pressure loss of these Examples and Comparative Examples were compared with the value of pressure loss of Comparative Example 1 as the reference, and the pressure loss was evaluated based on the following evaluation criteria. Furthermore, the pressure loss at the engine revolutions of 5,000 rpm was used in the evaluation.

Evaluation A: the ratio to Comparative Example 1 as the reference was −5% or less.

Evaluation B: the ratio to Comparative Example 1 as the reference was +5% or less.

Evaluation C: the ratio to Comparative Example 1 as the reference was +15% or less.

Evaluation D: the ratio to Comparative Example 1 as the reference exceeded +15%.

(Results)

In the plugged honeycomb structures of Examples 1 to 14, the evaluations of the PM accumulation limit were Evaluation C or better. On the contrary, in the plugged honeycomb structures of Comparative Examples 1, 2 and 11, the evaluations of the PM accumulation limit were Evaluation D. In this way, it was confirmed that the plugged honeycomb structures of Examples 1 to 14 configured so that the circumferential region had an open frontal area that was smaller than that in the center region in the inflow end face of the honeycomb segment had improved PM accumulation limit. In the plugged honeycomb structures that a thickness of the bonding layer was 1.6 mm in Comparative Examples 3 and 7, the evaluations of pressure loss were Evaluation D. In the plugged honeycomb structures that a thickness of the bonding layer was 0.4 mm in Comparative Examples 4 and 8, the evaluations of the PM accumulation limit were Evaluation D. In the plugged honeycomb structures that a thickness of the segment circumferential wall was 1.1 mm in Comparative Examples 5 and 9, both the PM accumulation limit and the pressure loss were Evaluation D. In the plugged honeycomb structures that a thickness of the segment circumferential wall was 0.2 mm in Comparative Examples 6 and 10, the evaluations of the PM accumulation limit were Evaluation D. Such results show that the thickness of the bonding layer and the thickness of the segment circumferential wall also significantly affect the PM accumulation limit and the pressure loss, and the thickness of the segment circumferential wall of 0.3 to 1.0 mm and the thickness of the bonding layer of 0.5 to 1.5 mm allow a PM accumulation limit to be raised and a pressure loss to be reduced.

The plugged honeycomb structure of the present invention can be used as a trapping filter to remove particulates or the like included in an exhaust gas emitted from a direct injection type gasoline engine, a diesel engine and the like. The plugged honeycomb segment of the present invention can be used to manufacture the plugged honeycomb structure of the present invention.

DESCRIPTION OF REFERENCE NUMERALS 1, 21, 41, 61, 81, 121: partition wall
2, 22, 42, 62, 82, 122: cell
2a, 22a, 42a, 62a, 82a, 122a: center region cell
2b, 22b, 42b, 62b, 82b, 122b: circumferential region cell
2x, 22x, 42x, 62x, 82x, 122x: outflow cell (predetermined cell)
2y, 22y, 42y, 62y, 82y, 122y: inflow cell (residual cell)
3, 23, 43, 63, 83, 123: segment circumferential wall
4, 24, 44, 64, 84, 124: honeycomb segment
4A, 24A, 44A, 64A, 84A, 124A: plugged honeycomb segment
5, 25, 45, 65, 85, 125: plugging portion
6: bonding layer
7: honeycomb-segment bonded member
8: outer wall
11, 31, 51, 71, 91, 131: inflow end face
12: outflow end face
13: first side
14: second side 15: third side
16: fourth side
18, 38, 58, 78, 98, 138: center region
19, 39, 59, 79, 99, 139: circumferential region
100: plugged honeycomb structure
P, Q: distance

What is claimed is:

1. A plugged honeycomb structure, comprising:
a plurality of prismatic columnar shaped honeycomb segments, each having porous partition walls that define a plurality of cells extending from an inflow end face to which a fluid flows to an outflow end face from which a fluid flows, and a segment circumferential wall disposed at an outermost circumference of each of the honeycomb segments;
a bonding layer to bond the side surfaces of the plurality of honeycomb segments; and
plugging portions disposed in open ends of predetermined cells in the inflow end face of each of the honeycomb segments and in open ends of residual cells in the outflow end face of each of the honeycomb segments, wherein
each of the honeycomb segments is configured so that the plurality of cells having at least two kinds of different shapes are disposed in a cross section orthogonal to an extension direction of the cells,
each of the honeycomb segments has a center region including a center of the cross section orthogonal to the extension direction of the cells and a circumferential region surrounding the circumference of the center region,
the center region and the circumferential region each have a cell arrangement pattern in the cross section of each of the honeycomb segments such that the outflow cells, in which the plugging portion is disposed in the open end of the cell in the inflow face, have a quadrangular shape, and the inflow cells, in which the plugging portion is disposed in the open end of the cell in the outflow end face, have a pentagonal shape, and eight pentagonal shaped inflow cells are configured to surround the periphery of the quadrangular shaped outflow cell,
in the inflow end face of at least one of the honeycomb segments, the circumferential region is configured to have an open frontal area that is smaller than an open frontal area of the center region,
a thickness of the segment circumferential wall of each of the honeycomb segments is from 0.3 to 1.0 mm,
a thickness of the bonding layer is from 0.5 to 1.5 mm,
a ratio of a distance Q to a distance P is in the range exceeding 0.4 and less than 1.1, where the distance P is a shortest distance connecting the center in a thickness direction of a first partition wall defining a first side of an outflow cell and the center in a thickness of a second partition wall opposed to the first side of the outflow cell, and defining a second side of the outflow cell and a first side of an adjacent inflow cell, and the distance Q is a shortest distance connecting the center in a thickness direction of the second partition wall defining the second side of the outflow cell and the first side of an adjacent inflow cell and the center in a thickness direction of a third partition wall opposed to the second partition wall and defining a second side of the adjacent inflow cell, and
a value obtained by subtracting a value of an open frontal area in the circumferential region from a value of an open frontal area in the center region is 10% or more.

2. The plugged honeycomb structure according to claim 1, wherein each of the honeycomb segments is configured so that the cells having at least two kinds of different shapes have a predetermined repeated arrangement pattern.

3. A plugged honeycomb segment, comprising:
a prismatic columnar shaped honeycomb segment having porous partition walls that define a plurality of cells extending from an inflow end face to which a fluid flows to an outflow end face from which a fluid flows, and a segment circumferential wall disposed at an outermost circumference of the honeycomb segment; and
plugging portions disposed in open ends of predetermined cells in the inflow end face the honeycomb segment and in open ends of residual cells in the outflow end face of the honeycomb segment, wherein
the honeycomb segment is configured so that the plurality of cells having at least two kinds of different shapes are disposed in a cross section orthogonal to an extension direction of the plurality of cells,
the honeycomb segment has a center region including a center of the cross section orthogonal to the extension direction of the plurality of cells and circumferential region surrounding the circumference of the center region,
the center region and the circumferential region each have a cell arrangement pattern in the cross section of the honeycomb segment such that the outflow cells, in which the plugging portion is disposed in the open end of the cell in the inflow face, have a quadrangular shape, and the inflow cells, in which the plugging portion is disposed in the open end of the cell in the outflow end face, have a pentagonal shape, and eight pentagonal shaped inflow cells are configured to surround the periphery of the quadrangular shaped outflow cell,
in the inflow end face of the honeycomb segment, the circumferential region is configured to have an open frontal area that is smaller than an open frontal area of the center region,
a thickness of the segment circumferential wall of the honeycomb segment is from 0.3 to 1.0 mm,
a ratio of a distance Q to a distance P is in the range of exceeding 0.4 and less than 1.1, where the distance P is a shortest distance connecting the center in a thickness direction of a first partition wall defining a first side of an outflow cell and the center in a thickness of a second partition wall opposed to the first side of the outflow cell, and defining a second side of the outflow cell and a first side of an adjacent inflow cell, and the distance Q is a shortest distance connecting the center in a thickness direction of the second partition wall defining the second side of the outflow cell and the first side of an adjacent inflow cell and the center in a thickness direction of a third partition wall opposed to the second partition wall and defining a second side of the adjacent inflow cell, and
a value obtained by subtracting a value of an open frontal area in the circumferential region from a value of an open frontal area at the center region is 10% or more.

4. The plugged honeycomb segment according to claim 3, wherein the honeycomb segment is configured so that the cells having at least two kinds of different shapes have a predetermined repeated arrangement.

* * * * *